United States Patent
Thesling et al.

(10) Patent No.: US 9,112,615 B1
(45) Date of Patent: Aug. 18, 2015

(54) LOW CYCLE SLIP PHASE RECOVERY FOR COHERENT RECEIVER

(71) Applicant: ViaSat, Inc., Carlsbad, CA (US)

(72) Inventors: William Thesling, Hudson, OH (US); Fan Mo, Hinckley, OH (US); Yuri Zelensky, Lyndhurst, OH (US)

(73) Assignee: ViaSat, Inc., Carlsbad, CA (US)

( * ) Notice: Subject to any disclaimer, the term of this patent is extended or adjusted under 35 U.S.C. 154(b) by 189 days.

(21) Appl. No.: 13/835,057

(22) Filed: Mar. 15, 2013

Related U.S. Application Data

(60) Provisional application No. 61/755,897, filed on Jan. 23, 2013.

(51) Int. Cl.
*H04B 10/06* (2006.01)
*H04B 10/61* (2013.01)

(52) U.S. Cl.
CPC .................................. *H04B 10/6165* (2013.01)

(58) Field of Classification Search
CPC . H04Q 10/611; H04Q 10/614; H04Q 10/616; H04Q 10/6165
USPC .................................................. 398/202–206
See application file for complete search history.

(56) References Cited

U.S. PATENT DOCUMENTS

| | | | |
|---|---|---|---|
| 7,522,841 B2 * | 4/2009 | Bontu et al. | 398/154 |
| 2006/0067432 A1 * | 3/2006 | Thesling et al. | 375/326 |
| 2012/0328305 A1 * | 12/2012 | Rahn et al. | 398/202 |
| 2014/0075258 A1 * | 3/2014 | Miller et al. | 714/746 |

* cited by examiner

*Primary Examiner* — Dzung Tran
(74) *Attorney, Agent, or Firm* — Holland & Hart LLP

(57) ABSTRACT

Methods, systems, and devices are described for detecting and correcting a cycle slip occurrence in a coherent receiver. Unique words are used in each received frame to detect phase changes that indicate the occurrence of a cycle slip within a frame. The location of the cycle slip is identified based on measurements made within the frame. Those measurements include phase estimation measurements and reliability measurements. A phase of a portion of the frame subsequent to the identified location of the cycle slip is adjusted to correct for the cycle slip. By combining phase estimates of symbols from both vertical and horizontal polarizations, the location of the cycle slip may be more accurately determined because the measurement windows is less susceptible to thermal noise. The phase estimates are combined by adjusting a phase of the symbols of one polarization to match a phase of the symbols of the other polarization.

22 Claims, 17 Drawing Sheets

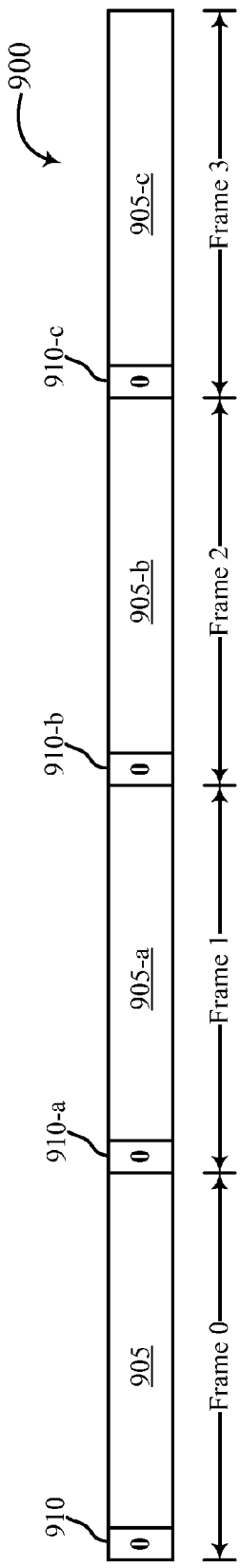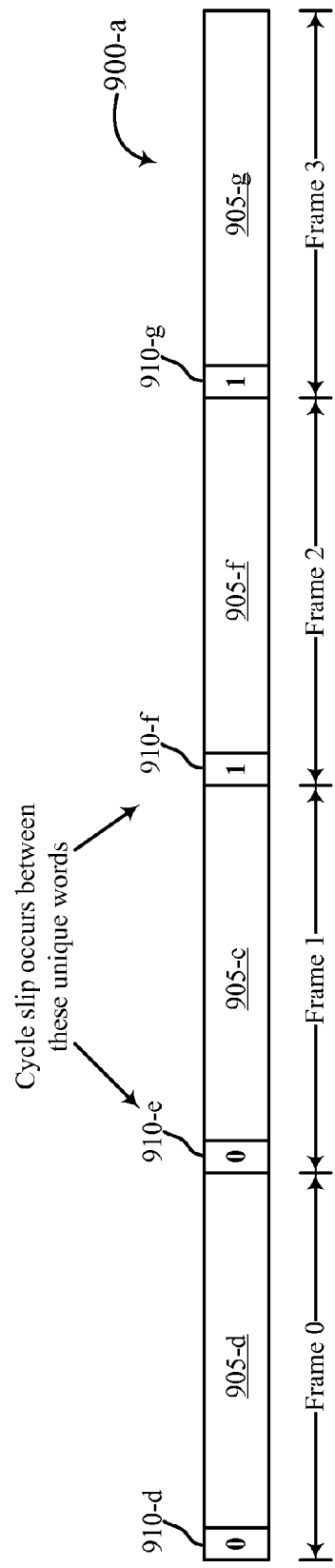
FIG. 9A
FIG. 9B

LOW CYCLE SLIP PHASE RECOVERY FOR COHERENT RECEIVER

CROSS REFERENCES

This application for patent claims priority benefit of U.S. provisional patent application Ser. No. 61/755,897 to Thesling et al., entitled "Low Cycle Slip Phase Recovery for Coherent Receiver," filed Jan. 23, 2013, the disclosure of which is incorporated herein in its entirety for all purposes.

BACKGROUND

The present disclosure relates to systems and methods digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at 10 or 40 Gigabit-per-second. Each fiber can carry multiple independent channels, each using a different wavelength of light in a technique known as wavelength-division multiplexing or WDM, thereby enhancing the net data rate of an optical fiber.

As more capacity is continually desired for networks, a demand for increased data transmission rates exists. However, in fiber optic systems, as data rates increase various optical phenomena begin to manifest and act to limit data transmission rates. For example, at the higher data transmission rates, phase-related phenomena such as laser phase noise, chromatic distortion, self-phase modulation, and/or cross-phase modulation may cause timing misalignments between a coherent transmitter and a coherent receiver that may limit the rate at which data is transmitted over an optical fiber.

SUMMARY

Methods, systems, and devices are described for detecting and correcting a cycle slip occurrence in a coherent receiver.

In a first set of embodiments, a method for correcting data from an optical signal includes detecting in a coherent receiver, a cycle slip occurrence within a frame based on a unique word in the frame. A location in the frame where the cycle slip occurred is identified based on measurements made within the frame. A phase of a portion of the frame subsequent to the location of the cycle slip is adjusted to correct that portion of the frame for the cycle slip.

In a second set of embodiments, a system for correcting data from an optical signal includes means for detecting in a coherent receiver, a cycle slip occurrence within a frame based on a unique word in the frame, means for identifying a location in the frame where the cycle slip occurred based on measurements made within the frame, and means for adjusting a phase of a portion of the frame subsequent to the location of the cycle slip to correct that portion of the frame for the cycle slip.

In a third set of embodiments, a coherent receiver device includes a detector module, an identifier module, and an adjuster module. The detector module is configured to detect a cycle slip occurrence within a frame based on a unique word in the frame. The identifier module is configured to identify a location in the frame where the cycle slip occurred based on measurements made within the frame. The adjuster module is configured to adjust a phase of a portion of the frame subsequent to the location of the cycle slip to correct that portion of the frame for the cycle slip.

In a fourth set of embodiments, a method for correcting data from an optical signal includes combining, in a coherent receiver, phase estimates of symbols of one polarization and phase estimates of symbols of a different polarization into a frame. A cycle slip occurrence within the frame is detected based on a unique word in the frame. A location in the frame where the cycle slip occurred is identified based on measurements made on the combined phase estimates within the frame. A phase of a portion of the frame subsequent to the location of the cycle slip is adjusted to correct that portion of the frame for the cycle slip.

In a fifth set of embodiments, a system for correcting data from an optical signal includes means for combining, in a coherent receiver, phase estimates of symbols of one polarization and phase estimates of symbols of a different polarization into a frame, means for detecting a cycle slip occurrence within the frame based on a unique word in the frame, means for identifying a location in the frame where the cycle slip occurred based on measurements made on the combined phase estimates within the frame, and means for adjusting a phase of a portion of the frame subsequent to the location of the cycle slip to correct that portion of the frame for the cycle slip.

In a sixth set of embodiments, a coherent receiver device includes a detector module, an identifier module, and an adjuster module. The detector module is configured to combine phase estimates of symbols of one polarization and phase estimates of symbols of a different polarization into a frame, and to detect a cycle slip occurrence within the frame based on a unique word in the frame. The identifier module is configured to identify a location in the frame where the cycle slip occurred based on measurements made on the combined phase estimates within the frame. The adjuster module is configured to adjust a phase of a portion of the frame subsequent to the location of the cycle slip to correct that portion of the frame for the cycle slip.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9A is a diagram that illustrates an example of frames with unique words for cycle slip detection according to various embodiments of the principles described herein.

FIG. 9B is a diagram that illustrates another example of frames with unique words for cycle slip detection according to various embodiments of the principles described herein.

DETAILED DESCRIPTION

Figure 1:
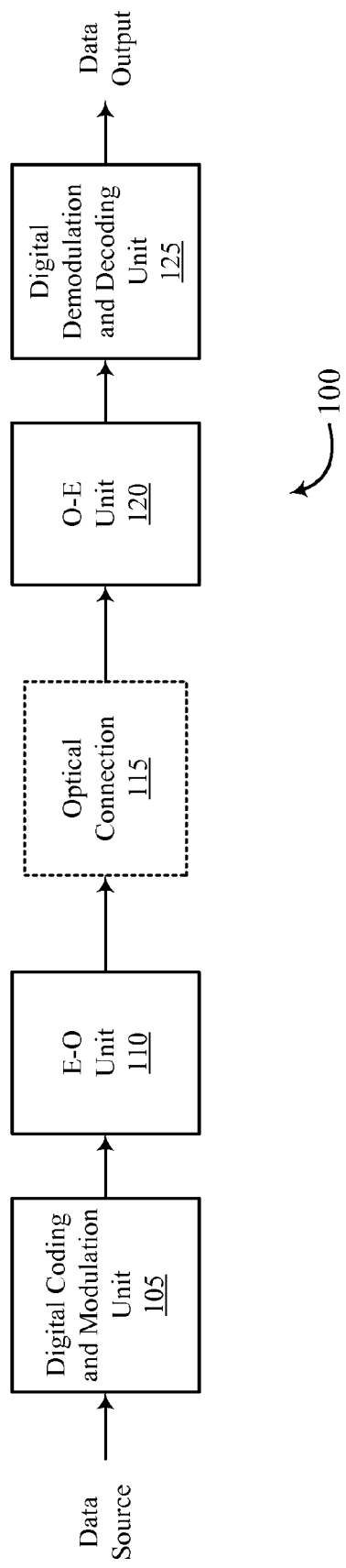
FIG. 1 is a block diagram of an example of an optical communication system including components configured according to various embodiments of the principles described herein.

Methods, systems, and devices are described for detecting and correcting a cycle slip occurrence in a coherent receiver. Unique words are used in a series of frames received by the coherent receiver to detect phase changes in consecutive frames that indicate the occurrence of a cycle slip within one of the frames. The location of the cycle slip is identified based on measurements made within the frame. Those measurements may include phase estimation measurements and reliability measurements. Once the location of the cycle slip is identified, a phase of a portion of the frame subsequent to the identified location is adjusted to correct for the cycle slip. By combining phase estimates from both vertical and horizontal polarizations during the frame measurements, the probability of a cycle slip is greatly reduced because phase estimates over a given estimation window are less susceptible to error induced by thermal noise since twice as many phase estimates are averaged for the same period of time. The phase estimates for the two polarizations are combined after first removing a quasi-static (i.e., low frequency) difference in the nominal relative phase of the two polarizations.

Cycle slips may cause bit errors resulting in information loss in an optical fiber system. For example, cycle slips in a coherent system may result in the loss of all of the data in the frame where a cycle slip took place. Differential encoding is typically used to mitigate the effects of cycle slips because only small portions of data are affected by a cycle slip occurrence. Using differential encoding, however, may result in a higher channel bit error rate at the same signal-to-noise ratio (SNR) or OSNR, adding cost to the optical infrastructure that is needed to close the link. Another suggested approach is to reduce the sources of phase noise, such as using a higher-grade better-quality laser, which increases system cost. Therefore, for systems to be able to operate at data transmission rates of 40 Gigabits-per-second (Gbps), or 100 Gbps, and meet target bit error rates (BER) of 1e-15, the occurrence of cycle slips needs to be addressed.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, methods, and software are described for an optical communication system that uses fiber optic cables as a data transmission medium or path. An example of an optical data transport system 100 is illustrated in FIG. 1. In the present example, the optical data transport system 100 includes a digital coding and modulation unit 105, an electrical-to-optical (E-O) unit 110, an optical connection 115, an optical-to-electrical (O-E) unit 120, and a digital demodulation and decoding unit 125. Each of these components may be in communication, directly or indirectly.

In one embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. In some instances, the transmission data rate across the optical data transport system 100 may be 40 Gbps or higher. For example, the transmission data rate may be 100 Gbps or as high as 200 Gbps.

The digital coding and modulation unit 105 receives this data, and performs framing, forward error correction coding, and modulation functions on the data. These functions may include using a QPSK or dual polarization QPSK (DP-QPSK) modulation scheme. The electrical-to-optical (E-O) unit 110 transforms the data into optical signals, and transmits optical signals containing the data via an optical connection 115. The optical signal produced by the E-O unit 110 may be coherently transmitted to the optical connection 115 by using one or more lasers (not shown), one or more optical components (not shown), and/or one or more electro-optic devices (not shown). The optical connection 115 may include well known components of such connections, including a fiber optic cable. In some embodiments, the optical connection 115 may include any type of medium or path that enables optical signals, or like signals, to propagate. The optical connection 115 may introduce several optical phenomena that may cause phase and/or amplitude distortion.

An optical-to-electrical (O-E) unit 120 receives the optical signal from the optical connection 115, and transforms the data into the electrical domain. The optical signal received by the E-O unit 120 may be coherently received from the optical connection 115 by using one or more lasers (not shown), one or more optical components (not shown), and/or one or more electro-optic devices (not shown). When coherently received, phase information included in the optical signal is preserved after the O-E unit 120 transforms the data in the optical signal to the electrical domain. In some instances, phase misalignments between the coherent transmission from the E-O unit 110 and the coherent reception at the O-E unit 120 resulting from phase noise may cause cycle slips in the data transformed to the electrical domain by the O-E unit 120.

The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

The functions performed by the digital demodulation and decoding unit 125 may also include detection and correction of cycle slips. For example, unique words are used in frames to detect phase changes in consecutive frames that indicate the occurrence of a cycle slip within one of the frames. The location of the cycle slip is then identified based on measurements made within the frame. Those measurements may include phase estimation measurements and reliability measurements. Once the location of the cycle slip is identified, a phase of a part of the frame is adjusted to correct for the cycle slip. By combining phase estimates of symbols from vertical and horizontal polarizations together during the frame measurements the probability of a cycle slip is greatly reduced because phase estimates over a given estimation window are less susceptible to error induced by thermal noise since twice as many phase estimates are averaged for the same period of time. To combine the phase estimates of the symbols, the phases of the symbols of different polarizations are adjusted by removing a quasi-static difference in the nominal relative phase of the two polarizations.

High-speed digital demodulation and decoding units 125 may typically operate at an analog-to-digital converter (ADC) sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to the symbol rate of the optical signal, thereby reducing the complexity and power consumption of the digital demodulation and decoding unit 125. Additionally, by using pulse-shaping filters and DACs during modulation, pre-compensation of non-ideal transmission conditions in the optical connection 115 may be performed by circuitry in the digital coding and modulation unit 105. Similarly, by using ADCs and pulse-shaping filters during demodulation, post-compensation of non-ideal transmission conditions in the optical connection 115 may be performed by circuitry in the digital demodulation and decoding unit 125.

Figure 2:
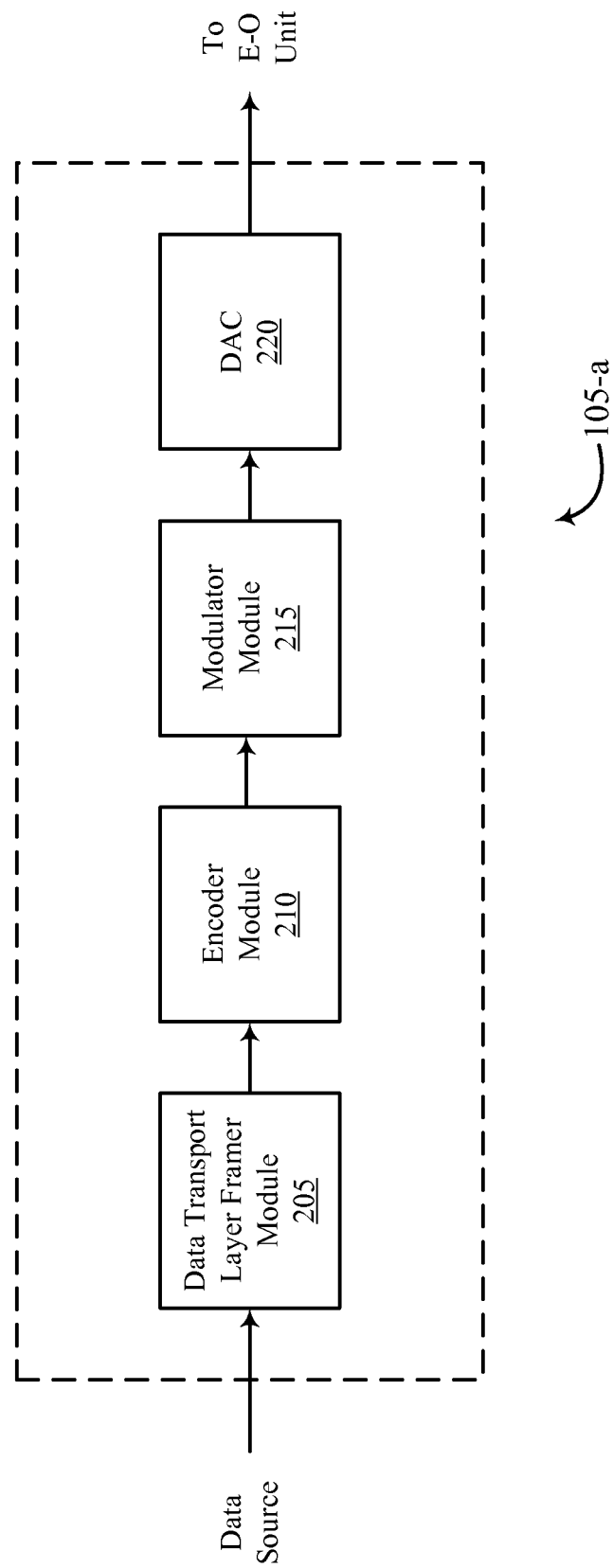
FIG. 2 is a block diagram of an example of a digital coding and modulation module according to various embodiments of the principles described herein.

FIG. 2 illustrates a digital coding and modulation unit 105-*a*. The digital coding and modulation unit 105-*a* may be an example of the digital coding and modulation unit 105 described above with reference to FIG. 1. In the illustrated embodiment, the digital coding and modulation unit 105-*a* includes a data transport layer framer module 205, an encoder module 210, a modulator module 215, and a DAC 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a cyclic redundancy check (CRC). As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames.

The modulator module 215 may perform pulse-shaping and pre-compensation filtering on the frames and FEC information, and modulate the frames and FEC information onto one or more sinusoidal waves generated in the digital domain, and forward the data to the DAC 220. The modulator module 215 may use a QPSK or a DP-QPSK modulation scheme, for example. The DAC 220 may convert the digital signal of the modulated data into an analog signal, which may be forwarded to an E-O unit (e.g., E-O unit 110) for conversion from the electrical domain to the optical domain.

Figure 3:
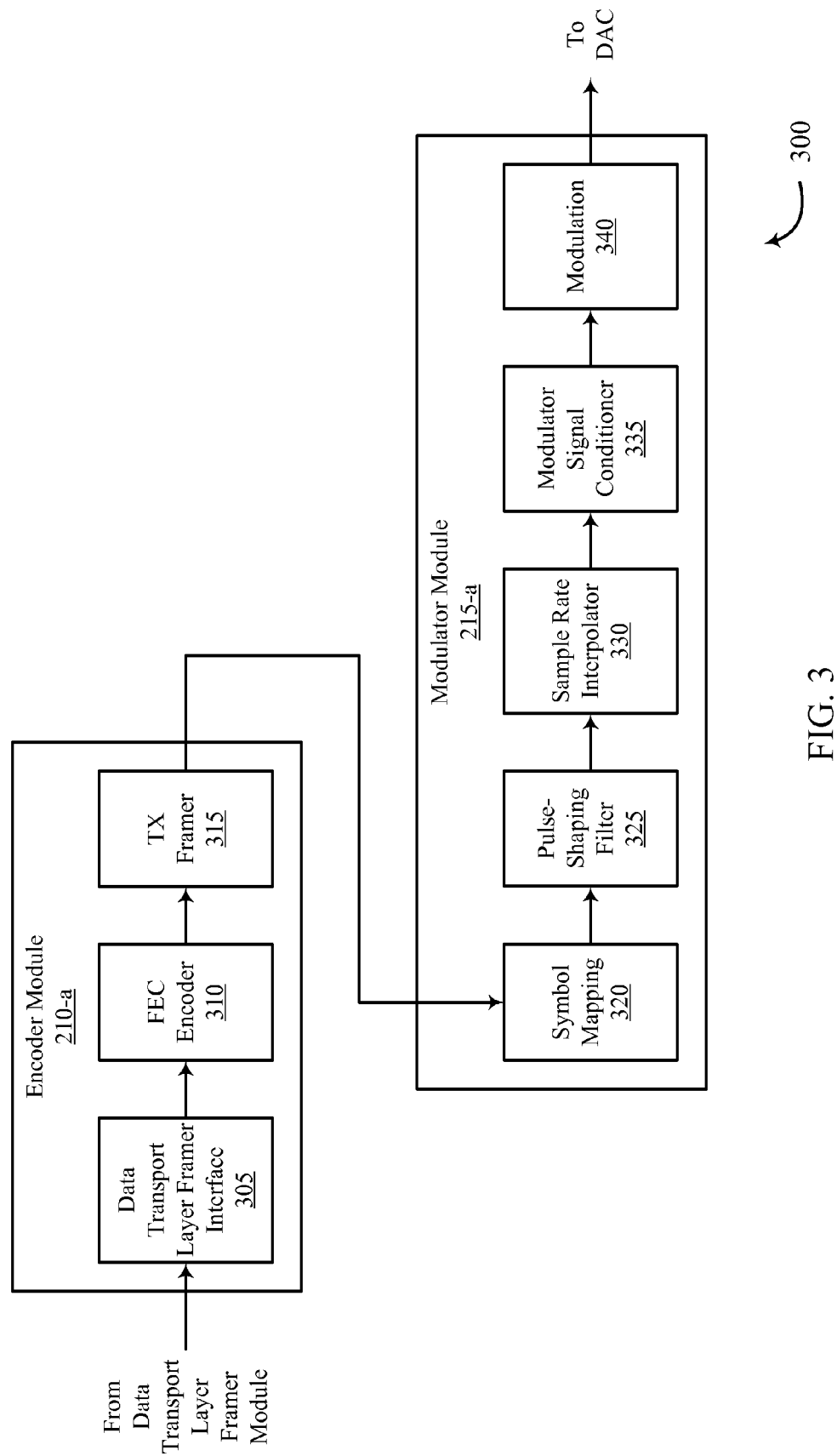
FIG. 3 is a block diagram of an example of an encoder and a modulator in a digital coding and modulation module according to various embodiments of the principles described herein.

FIG. 3 illustrates a system 300 that includes an encoder module 210-*a* and a modulator module 215-*a*. Each of these components may be in communication, directly or indirectly. The encoder module 210-*a* and the modulator module 215-*a* may be examples, respectively, of the encoder module 210 and the modulator module 215 described above with reference to FIG. 2.

As shown in FIG. 3, the encoder module 210-*a* includes a data transport layer framer interface module 305, an FEC encoder module 310, and a transmission (TX) framer module 315. The data transport layer framer interface module 305 may receive data to be transmitted from an application or other process external to the encoder 210-*a*. The data received from the data transport layer may be framed as one or more streams of serial bits for transmission.

The data transport layer framer interface module 305 may forward the data for transmission to the FEC encoder module 310. The FEC encoder module 310 may perform forward error correction on the data to be transmitted. The FEC encoder module 310 may support one or more types of forward error correction techniques. For example, the FEC encoder module 310 may support Turbo Product Code (TPC) encoding, which may be used to increase data reliability and reduce the overall bandwidth for transmission of the data. Another type of forward error correction is Low-Density Parity Check (LDPC), which is based on a linear error correction code. The transmission framer module 315 may receive the FEC encoded bits and frame the bits for symbol mapping at the modulator 215-a.

The modulator module 215-a may include a symbol mapper module 320, a pulse-shaping filter module 325, a sample rate interpolator module 330, a modulator signal conditioner module 335, and a modulation module 340. Each of these components may be in communication, directly or indirectly.

The symbol mapper module 320 may receive the framed, encoded bits from the transmission framer 315 of the encoder and map the bits to modulation symbols according to a particular modulation scheme. In certain examples, the symbol mapper module 320 may use a QPSK or a DP-QPSK modulation scheme, for example.

The symbol-mapped bits may then be received at the pulse-shaping filter module 325 in multiples streams. At the pulse-shaping filter module 325, each of the streams may be filtered in the digital domain with at least one pulse-shaping filter. The at least one pulse-shaping filter may include a finite impulse response (FIR) filter or an infinite impulse response (IIR) filter with adjustable tap coefficients. The at least one pulse-shaping filter may be, for example, a root-raised cosine filter or other known pulse-shaping filter that may reduce or adjust the bandwidth associated with the streams symbol-mapped bits. Additionally or alternatively, each stream of symbol-mapped bits may be filtered using an adjustable time and/or frequency domain filter.

Additionally, the pulse-shaping filter module 325 may filter each stream of symbol-mapped bits to pre-compensate for at least one known or predicted non-ideal transmission condition. The non-ideal transmission condition may occur in the optical space, such as chromatic dispersion and/or timing skew that occurs when an optical signal is transmitted through an optical fiber or other optical medium or path. Additionally or alternatively, the non-ideal transmission condition may occur in the electrical domain. For example, the non-ideal transmission condition may include a non-linear amplifier response at the transmitting or receiving end, or component or channel roll-off that occurs in a DAC, an ADC, or another electrical component.

In certain examples, the non-ideal transmission condition may be predicted or determined based on measurements taken at one or more points in the transmitter, the signal path, or the receiver. For example, a receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse-shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse, lessen, or compensate the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse-shaping filter(s) of the pulse-shaping filter module 325 may be dynamically tunable through the use of changeable filter tap coefficients. In certain examples, the type of filter itself may be dynamically changed to pre-compensate for a non-ideal transmission condition. For example, one or more filters in the pulse-shaping filter module 325 may be dynamically changed from a root-raised cosine filter to a simple raised-cosine filter, a Gaussian filter, or a sinc-shaped filter if such a change would more effectively pre-compensate for a known or predicted non-ideal transmission condition.

Additionally, in certain examples it may be possible to dynamically customize the filtering performed at each stream of symbol-mapped bits. For example, when the symbol mapper module 320 produces HI, HQ, VI, and VQ streams, it may be determined that an optical transmission path introduces a timing skew between the HI and HQ streams, but not between the VI and VQ streams. In this example, the properties of a pulse-shaping filter associated with the HI and/or HQ streams may be adjusted to pre-compensate for the timing skew without making adjustments to the VI and VQ streams.

The output of the pulse-shaping filter module 325 may be received at the sample rate interpolator module 330. The sample rate interpolator module 330 may add bits to each of the streams of symbol-mapped bits to increase the sample rate of each stream, for example, to twice the symbol rate. The modulator signal conditioner module 335 may receive the output of the sample rate interpolator module 330 and may perform additional filtering on each of the streams in the digital domain. For example, the modulator signal conditioner module 335 may perform direct current (DC) bias compensation. Additionally or alternatively, the modulator signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters that may be dynamically adjusted as changes in DC bias or amplifier non-linearity are detected, predicted, or determined. In some embodiments, some or all of the functionality of the modulator signal conditioner module 335 is performed at the phase-shaping filter module 325.

The output of the modulator signal conditioner module 335 may be received by the modulation module 340. The modulation module 340 may generate sinusoidal waves or waveforms in the digital domain and modulate the filtered, up-sampled, and conditioned symbol-mapped bits that are output by the modulator signal conditioner module 335 onto the sinusoidal waveforms. In certain examples, the sinusoidal waveforms may have a relatively low intermediate frequency.

The modulated waves may be output by the modulation module 340 to one or more DACs (not shown), which may convert each modulated carrier wave from the digital domain to the analog domain. The waveforms in the analog domain that are output by the DAC(s) may undergo amplification and additional conditioning. When H and V polarizations are used, the amplified and conditioned waveforms may be converted into separate H and V optical signals at an E-O unit (not shown).

Figure 4:
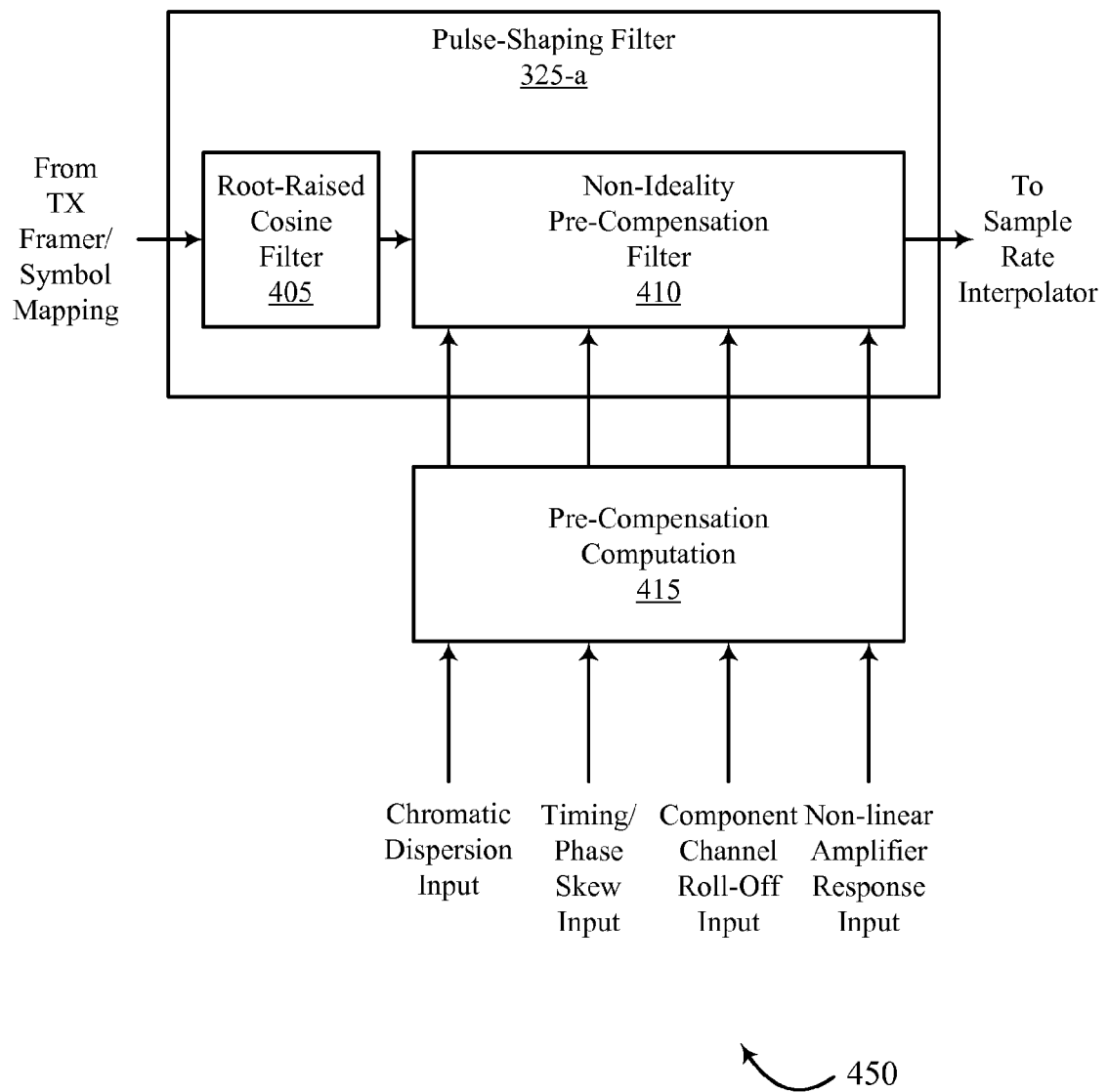
FIG. 4 is block diagram of an example of a pulse-shaping filter module according to various embodiments of the principles described herein.

FIG. 4, a system 450 is shown in which a pulse-shaping filter module 325-a is coupled to a pre-compensation computation module 415. The pulse-shaping filter module 325-a may be an example of the pulse-shaping filter module 325 described above with reference to FIG. 3.

The pulse-shaping filter module 325-a may include a root-raised cosine filter module 405 and a non-ideality pre-compensation filter module 410. The root-raised cosine filter module 405 may filter incoming streams of symbol-mapped bits (e.g., pulses of high and low voltages) to form the bits into a root-raised cosine shape. This root-raised cosine filter module 405 may reduce the bandwidth of the streams, thereby reducing inter-symbol interference. Additionally or alternatively, other types of pulse-shaping filters may be used, including, but not limited to, boxcar filters, sinc filters, raised-cosine filters, Gaussian filters, and the like.

The non-ideality pre-compensation filter module 410 may filter the streams of symbol-mapped bits in the digital domain to compensate for one or more predicted, determined, or known non-ideal transmission conditions. The non-ideality pre-compensation filter module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In other embodiments, input regarding more or fewer non-ideal transmission conditions may be received at the non-ideality pre-compensation filter module 410.

The input received by non-ideality pre-compensation filter module 410 may be used to generate a filtering function in the digital domain which is substantially inverse to a measured, a determined, or a predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse-shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filter module 405 and the non-ideality pre-compensation filter module 410 may be implemented by a single discrete filter for each stream of symbol-mapped bits. Alternatively, the symbol-mapped bits may be sequentially filtered by a root-raised cosine filter and a non-ideality pre-compensation filter. In certain examples, the order in which each stream undergoes root-raised cosine filtering and non-ideality pre-compensation filtering may vary. In certain examples, the order of filtering may be dynamically modified to achieve a most favorable result. Moreover, in certain examples, a first stream (e.g., HI stream) of symbol-mapped bits may be passed through root-raised cosine filtering and non-ideality pre-compensation filtering in a different order than a second stream (e.g., VQ stream) of symbol-mapped bits.

The pre-compensation computation module 415 may receive input from an external application, process, or device and/or from one or more registers storing saved or default input regarding non-ideal transmission conditions. The input may be used by the pre-compensation computation module 415 to compute a set of filter tap coefficient values for a discrete pulse-shaping filter implementing at least the non-ideality pre-compensation filter module 410. In certain examples, the pre-compensation computation module 415 may compute the filter tap coefficient values based on a weighted consideration of the totality of the received input. Additionally or alternatively, the pre-compensation computation module 415 may compute the filter tap coefficient values based on a one-to-one correlation between non-ideal transmission conditions and filter tap coefficient values.

Figure 5:
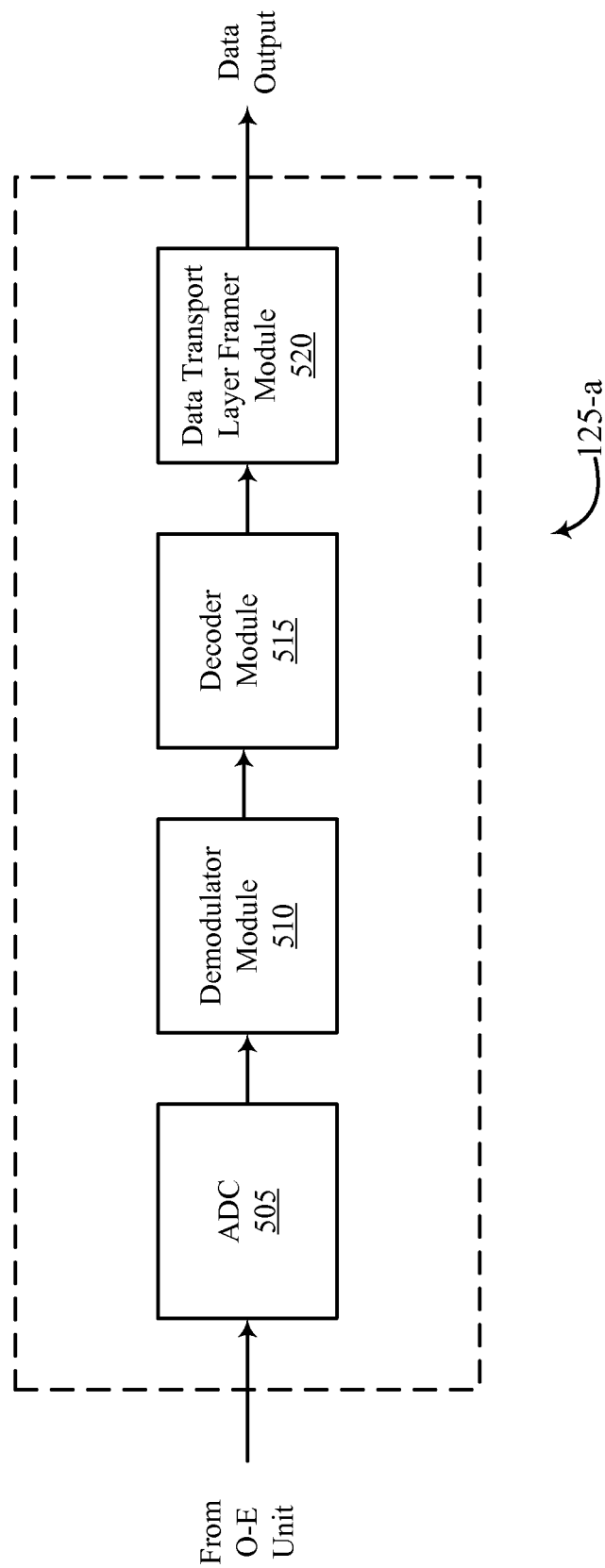
FIG. 5 is a block diagram of an example of a digital demodulation and decoding module according to various embodiments of the principles described herein.

As illustrated in FIG. 5, an example of a digital demodulation and decoding unit 125-a is shown. The digital demodulation and decoding unit 125-a may be an example of the digital demodulation and decoding unit 125 described above with reference to FIG. 1. In this embodiment, the digital demodulation and decoding unit 125-a includes an ADC 505, a demodulator module 510, a decoder module 515, and a data transport layer framer module 520. Each of these components may be in communication, directly or indirectly.

The ADC 505 may sample an electrical and analog version of an optical and analog signal received by an O-E unit (not shown). The optical signal from the E-O unit may have been transmitted at a data transmission rate of 40 Gbps or 100 Gbps, for example. Moreover, the optical signal may have been coherently transmitted to include phase information in the optical signal. The ADC 505 may provide a digitally sampled version of the optical/analog signal to the demodulator module 510, which demodulates the digitally-sampled signal and provides the demodulated data to the decoder module 515. The demodulator module 510 may also compensate for non-ideal transmission conditions.

The demodulator module 510 may detect cycle slips and may perform operations to mitigate or correct for the cycle slips. For example, the demodulator module 510 may detect phase changes in consecutive frames based on the phases of unique words within the frames. A change in phase may indicate that a cycle slip has occurred within one of the frames. The demodulator module 510 may identify the location of the cycle slip based on measurements made within the frame, including phase estimation measurements and/or reliability measurements. Once the location of the cycle slip is identified, the demodulator module 510 may adjust (e.g., rotate) a phase of the part of the frame subsequent to the cycle slip location to correct for the cycle slip. With this approach, data in that portion of the frame is not lost because of the cycle slip. The demodulator module 510 may combine phase estimates of symbols from both vertical and horizontal polarizations during the frame measurements to more accurately determine the location of the cycle slip in the frame and/or to reduce the probability of a cycle slip because phase estimates over a given estimation window are less susceptible to error induced by thermal noise since twice as many phase estimates are averaged for the same period of time. The phase estimates may be combined by adjusting a phase of the symbols of one polarization to match a phase of the symbols of the other polarization. The adjusting or matching may include removing a quasi-static difference in the nominal relative phase of the two polarizations.

The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data may be output to, for example, a user or any receiving system.

Figure 6:
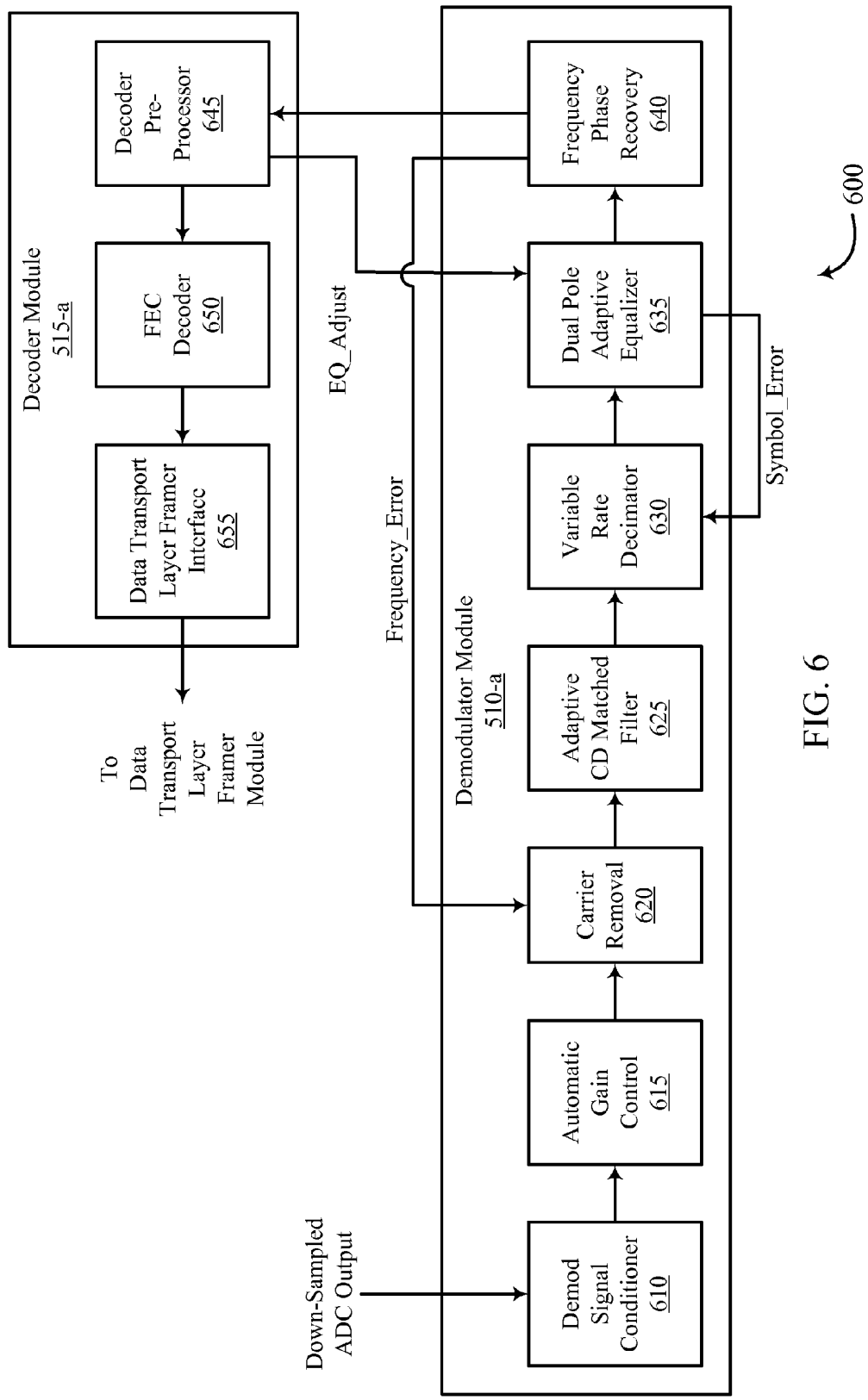
FIG. 6 is a block diagram of an example of a demodulator and a decoder according to various embodiments of the principles described herein.

FIG. 6 is a block diagram of a system 600 that includes a demodulator module 510-a and a decoder module 515-a. Each of these components may be in communication, directly or indirectly. The demodulator module 510-*a* and the decoder module 515-*a* may be respective examples of the demodulator module 510 and the decoder module 515 described above with reference to FIG. 5.

The demodulator 510-*a* may include a demodulator signal conditioner module 610, an automatic gain control module 615, a carrier removal module 620, an adaptive chromatic dispersion (CD) matched filter module 625, a variable rate decimator 630, a dual pole adaptive equalizer module 635, and a frequency phase recovery module 640.

Through the use of pulse-shaping to reduce inter-symbol interference and the effects of non-ideal transmission conditions, it may be possible to perform some of the filtering and other preliminary demodulation steps on a version of the optical signal that is sampled at or near the baud rate (e.g., the symbol rate) of the optical signal. However, an ADC that samples the optical signal at a rate of twice the symbol rate may be more readily obtainable and less expensive than an ADC that samples at or near the baud rate of the optical signal. Therefore, in some embodiments, an ADC that samples at twice the symbol rate may be used, and the output of the ADC may be down-sampled to just over the baud rate of the optical signal (e.g., between 1.0 and 1.3 times the baud rate).

The demodulator signal conditioner module 610 may receive the down-sampled version from the ADC and perform preliminary filtering on the received sampled version of the optical signal. The automatic gain control module 615 may automatically adjust the gain of the down-sampled version of the optical signal to bring the amplitude of the modulated carrier wave into an acceptable range. The carrier removal module 620 may then extract the symbol-mapped bits from the carrier frequency according to the modulation scheme used in the optical signal.

The adaptive CD matched filter 625 may filter the symbol-mapped bits to compensate for chromatic dispersion in the optical transmission path. In certain examples, the adaptive CD matched filter 625 may match one or more filters in the modulator of the device transmitting the optical signals. The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may up-sample the extracted and filtered symbol-mapped bits to the original sample rate of the ADC (e.g., twice the symbol rate). The dual pole adaptive equalizer module 635 performs additional filtering on the streams of symbol-mapped bits in the digital domain to reduce inter-symbol interference and allow for the recovery of the modulated data. The dual pole adaptive equalizer module 635 may perform an inverse or matched filtering function of one or more pulse-shaping filters in the transmitter. The dual pole adaptive equalizer module 635 may be configured to support one or more polarizations in the modulation scheme. After equalization, the frequency phase recovery module 640 may recover the encoded bits.

The frequency phase recovery module 640 may detect cycle slips and may perform operations to mitigate or correct for the cycle slips. For example, the frequency phase recovery module 640 may detect phase changes in consecutive frames based on the phases of unique words within the frames. In certain examples, the unique words may have a length of about 64 symbols that may be used to detect the phase alignment between consecutive frames. When a turbo product code (TPC) is used for FEC, a unique word may be inserted every 9,000 symbols, approximately, since the TPC has typical a block size of 8192 symbols. A change in phase between two consecutive unique words may indicate that a cycle slip has occurred somewhere between those two consecutive unique words. The frequency phase recovery module 640 may identify or estimate the location of the cycle slip based on measurements made within the frame, including phase estimation measurements and/or reliability measurements. Once the location of the cycle slip is identified, the frequency phase recovery module 640 may adjust (e.g., rotate) a phase of the part of the frame subsequent to the cycle slip location to correct for the cycle slip. With this approach, data in that portion of the frame is not lost because of the cycle slip. The frequency phase recovery module 640 may also combine phase estimates of symbols from both vertical and horizontal polarizations during the frame measurements to more accurately determine the location of the cycle slip in the frame and/or to reduce the probability of a cycle slip because phase estimates over a given estimation window are less susceptible to error induced by thermal noise since twice as many phase estimates are averaged for the same period of time. The phase estimates may be combined by adjusting a phase of the symbols of one polarization to match a phase of the symbols of the other polarization. The adjusting or matching may include removing a quasi-static difference in the nominal relative phase of the two polarizations.

The decoder module 515-*a* of the present example includes a decoder pre-processor module 645, an FEC decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-*a*. The FEC decoder module 650 may perform forward error correction on the encoded bits to identify and correct errors and reconstruct the originally transmitted stream of data. The FEC decoder module 650 may support one or more decoding techniques such as TPC decoding and LDPC decoding, for example. The data transport layer framer interface 655 may forward the originally transmitted stream of data to a data transport layer framer for processing and delivery.

Figure 7:
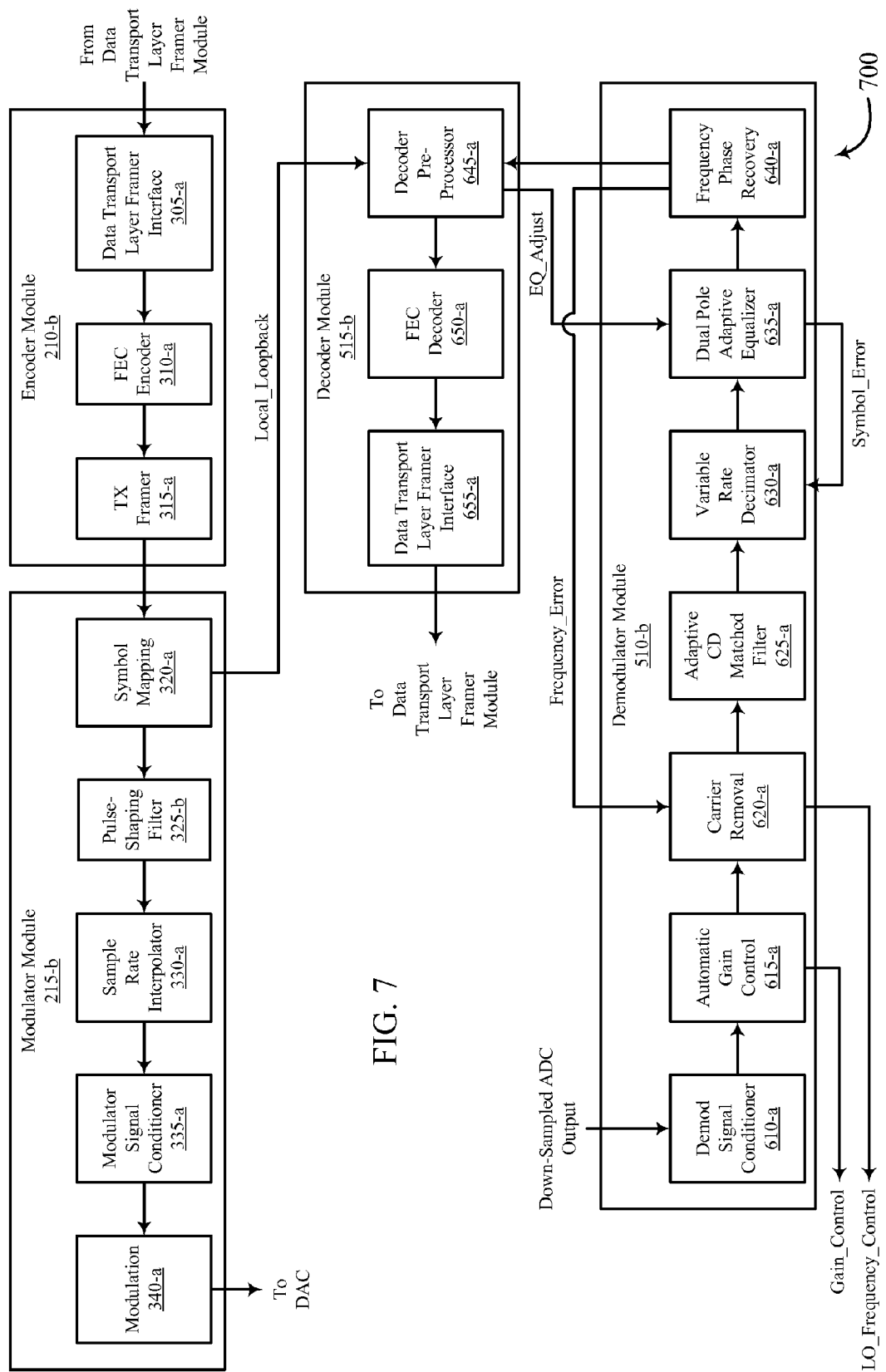
FIG. 7 is a block diagram of an example of an optical modem according to various embodiments of the principles described herein.

FIG. 7 illustrates a block diagram of an example of a modem device 700. The modem 700 includes an encoder module 210-*b*, a modulator module 215-*b*, a demodulator module 510-*b*, and a decoder module 515-*b*. The encoder module 210-*b* may be an example of the encoder modules 210 and 210-*a* described above with reference to FIG. 2 and FIG. 3, respectively. The modulator module 215-*b* may be an example of the modulator modules 215 and 215-*a* described above with reference to FIG. 2 and FIG. 3, respectively. The demodulator module 510-*b* may be an example of the demodulator modules 510 and 510-*a* described above with reference to FIG. 5 and FIG. 6, respectively. The decoder module 515-*b* may be an example of the decoder modules 515 and 515-*a* described above with reference to FIG. 5 and FIG. 6, respectively.

The encoder module 210-*b* may include a data transport layer framer interface module 305-*a*, an FEC encoder module 310-*a*, and a TX framer module 315-*a*. These components may be examples of the data transport layer framer interface module 305, the FEC encoder module 310, and the TX framer module 315 described above with reference to FIG. 3. The modulator module 215-*b* may include a symbol mapper module 320-*a*, a pulse-shaping filter module 325-*b*, a sample rate interpolator module 330-*a*, a modulator signal conditioner module 335-*a*, and a modulation module 340-*a*. These components may be examples of the symbol mapper module 320, the pulse-shaping filter module 325, the sample rate interpolator module 330, the modulator signal conditioner 335, and the modulation module described above with reference to FIG. 3. Additionally, the pulse-shaping filter 325-b may be an example of the pulse-shaping filter 325-a described above with reference to FIG. 4.

The demodulator module 510-b of the example in FIG. 7 may include a demodulator signal conditioner module 610-a, an automatic gain control module 615-a, a carrier removal module 620-a, an adaptive CD matched filter module 625-a, a variable rate decimator module 630-a, a dual pole adaptive equalizer module 635-a, and a frequency phase recovery module 640-a. These components may be examples of the demodulator signal conditioner module 610, the automatic gain control module 615, the carrier removal module 620, the adaptive CD matched filter module 625, the variable rate decimator module 630, the dual pole adaptive equalizer module 635, and the frequency phase recovery module 640 described above with reference to FIG. 6.

The decoder module 515-b may include a decoder pre-processor module 645-a, an FEC decoder module 650-a, and a data transport layer framer interface 655-a. These components may be examples of the decoder pre-processor module 645, the FEC decoder module 650, and the data transport layer framer interface module 655 described above with reference to FIG. 6.

As shown in FIG. 7, components of the modulator module 215-b, the decoder module 515-b, and the demodulator module 510-b may interact with each other. For example, the symbol mapper module 320-a of the modulator module 215-b may provide local loopback feedback signal (Local_Loopback) to the decoder pre-processor module 645-a to increase the accuracy of the decoder pre-processor module 645-a. The decoder pre-processor module 645-a may provide an equalizer adjustment feedback signal (EQ_Adjust) to the dual pole adaptive equalizer 635-a of the demodulator 510-b to dynamically adjust the equalization filtering at the demodulator module 510-c.

The frequency phase recovery module 640-a of the demodulator module 510-b may provide a frequency error signal (Frequency_Error) to the carrier removal module 620-a to allow the carrier removal module 620-a to achieve frequency lock with the carrier frequency. The dual pole adaptive equalizer module 635-a may provide a symbol error feedback signal (Symbol_Error) to the variable rate decimator module 630-a to allow the variable rate decimator module 630-a to dynamically adjust the sampling rate and reduce inter-symbol interference. The carrier removal module 620-a may provide a local oscillator frequency control signal (LO_Frequency_Control) to correct the frequency of a local oscillator signal that is used to demodulate the received optical signal. Additionally, the automatic gain control 615-a may provide a gain control signal (Gain_Control) that is based on the gain being applied to the amplitude of the modulated carrier wave.

Figure 8B:
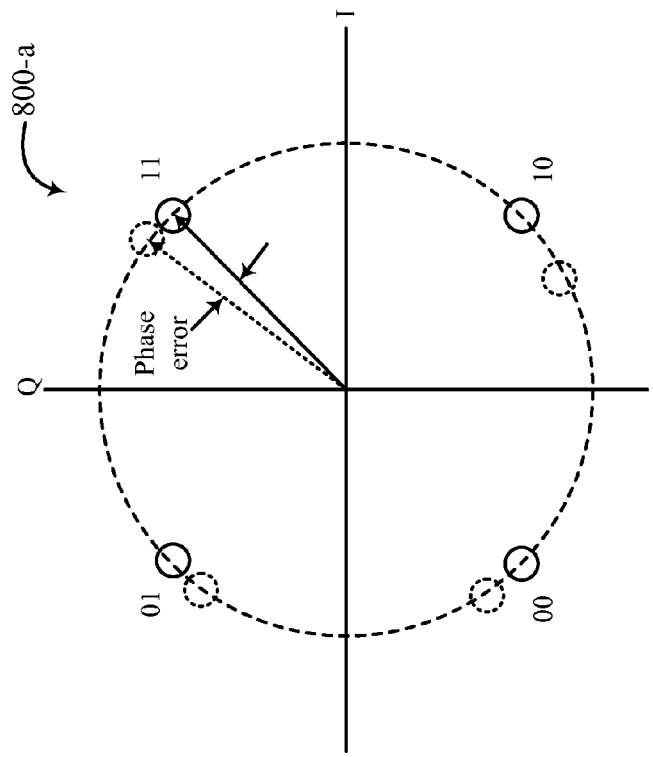
FIG. 8B is a diagram that illustrates an example of phase error and frequency error in a QPSK constellation according to various embodiments of the principles described herein.
Figure 8A:
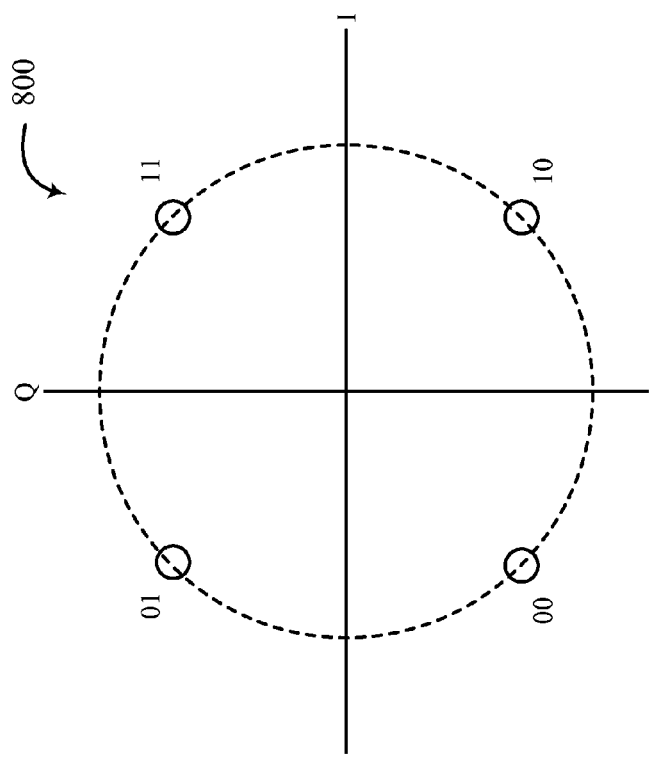
FIG. 8A is a diagram that illustrates an example of a Quadrature Phase-Shift Keying (QPSK) constellation according to various embodiments of the principles described herein.

FIG. 8A illustrates an example of a constellation diagram for a modulation scheme that may be used for coherent optical communications. The constellation diagram 800 represents a typical QPSK or DP-QPSK modulation scheme in which four symbols are equally spaced on a circle that is centered at the origin of a complex plane defined by a quadrature (Q)-axis and an in-phase (I)-axis. There are two bits mapped to each symbol and the symbols are Gray-coded such that only one bit changes between adjacent symbols. The symbols corresponding to the bit pairs (11), (01), (00), and (11) are respectively located on the circle at 45°, 135°, 225°, and 315° relative to the positive I-axis. Each bit pair is therefore located within one of the four quadrants of the complex plane.

FIG. 8B illustrates an example of frequency and phase errors that may occur in recovered symbols as a result of phase-related phenomena. A constellation diagram 800-a is shown that is an example of the constellation diagram 800 of FIG. 8A. The frequency and phase errors may cause the recovered symbols (dotted lines) to be offset from the expected symbols (solid lines). For the symbol corresponding to the bit pair (11), for example, the phase error is shown to correspond to the difference in the angles of the recovered symbol and the expected symbol. The frequency error may cause the recovered constellation to become a circle of symbols instead of four separate symbols as illustrated in FIG. 8A.

During carrier recovery in a coherent receiver, both phase errors and frequency errors may be detected and corrected. For example, the frequency phase recovery module 640 or the frequency phase recovery module 640-a described above with reference to FIGS. 6 and 7, respectively, may be used to detect and correct for phase and frequency errors. The frequency phase recovery module 640-a of FIG. 7, for example, may be used to perform phase and frequency recovery by estimating the relative phase difference from the 45° angle positions (and similarly from other angles) for a group of symbols such that the estimates for consecutive, overlapping groups of symbols are linearly interpolated to estimate a phase error value of each input symbol and to remove this error by rotating each symbol by its estimated phase error value.

One technique that is used to identify phase errors in QPSK is "4θ estimation." In this technique, the angle/phase of each symbol is multiplied by four. When there is no phase error, the resulting angle for any symbol lies along the negative I-axis. When there is a shift in the phase of the symbols, the angle that results from the multiplication is offset from the negative I-axis and the actual phase shift may be determined by dividing the amount of offset by four. The "4θ estimation" technique, however, may not be able to determine whether there is a ±90° rotation or a ±180° rotation, and may not be applicable to cycle slip detection. Moreover, a typical phase estimation operation may still work even if the phase is off by ±90° or ±180° and, therefore, results from phase estimation alone may not detect if a cycle slip has occurred. Other approaches, which are described herein, may be used to effectively detect and correct a cycle slip occurrence in a coherent receiver.

Figure 8C:
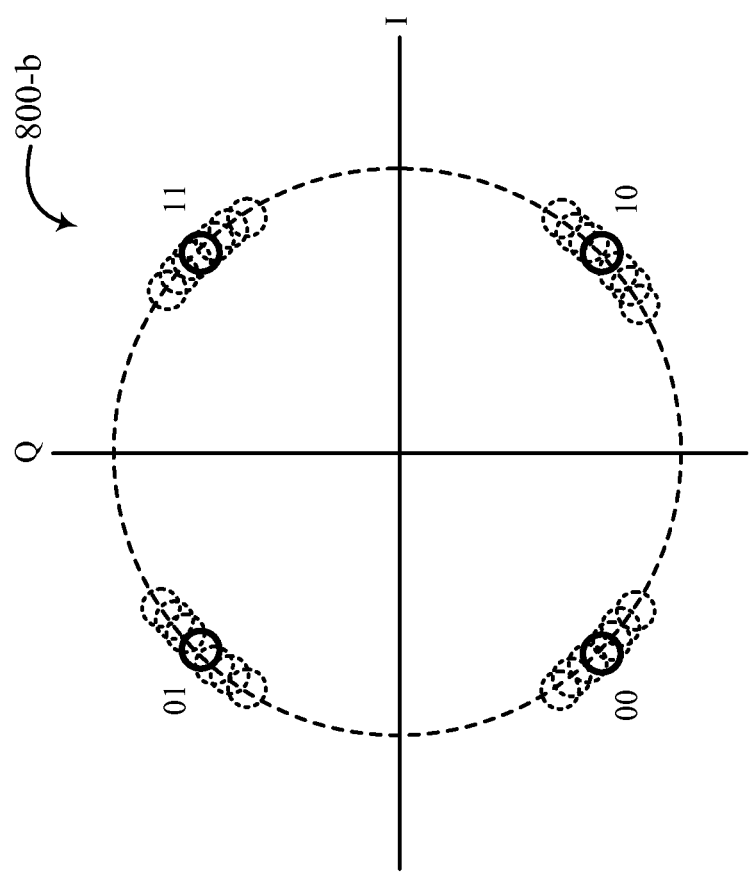
FIG. 8C is a diagram that illustrates an example of phase noise in a QPSK constellation according to various embodiments of the principles described herein.

FIG. 8C illustrates an example of phase noise that may occur in recovered symbols as a result of phase-related phenomena. A constellation diagram 800-b is shown that is an example of the constellation diagram 800 of FIG. 8A. In the constellation diagram 800-b, phase noise is illustrated by a small arc that is formed by recovered symbols (dotted lines) that are slightly offset from an expected symbol (heavy solid line). By removing the data pattern (e.g., by using 4θ estimation), the data pattern is removed and what is left is typically thermal and phase noise. Averaging consecutive symbols to remove the thermal noise may provide a residual phase noise estimate. Observation windows may be used in the time-domain to consider groups of consecutive symbols.

Figure 8D:
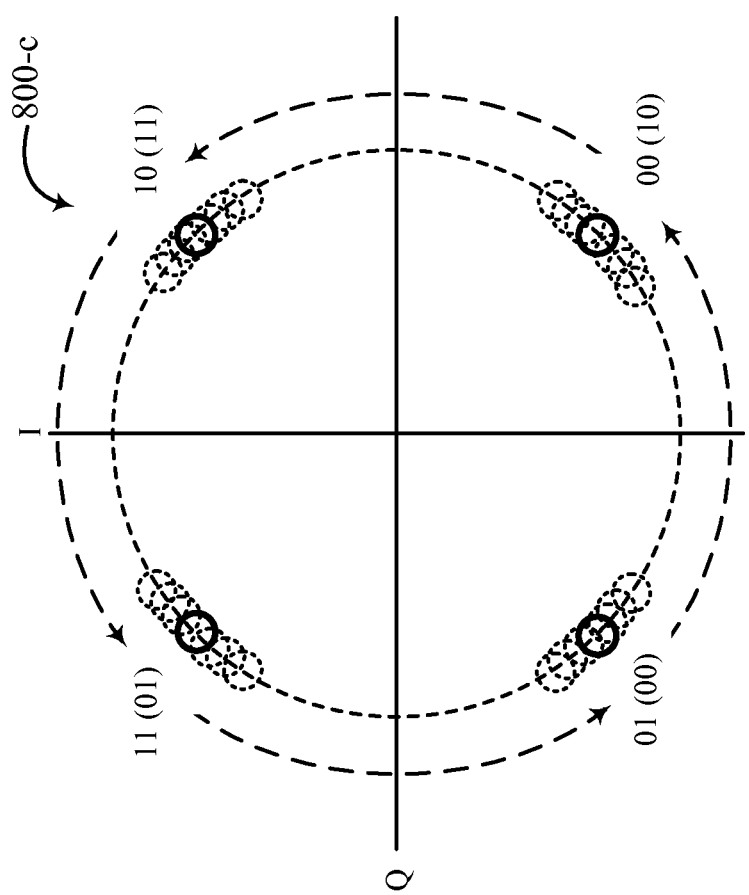
FIG. 8D is a diagram that illustrates an example of a cycle slip with reference to a QPSK constellation according to various embodiments of the principles described herein.

FIG. 8D illustrates an example of a cycle slip that may occur from misalignments between a coherent transmitter and a coherent receiver as a result of phase-related phenomena. A constellation diagram 800-c is shown that is an example of the constellation diagram 800 of FIG. 8A. The constellation diagram 800-c shows that phase noise remains about the expected symbols. Moreover, the constellation diagram 800-c illustrates that the quadrants are now rotated by +90° compared to the quadrants in the constellation diagram 800 of FIG. 8A. When such a rotation occurs, and the coherent receiver is out of cycle with respect to the coherent transmitter, the coherent receiver may incorrectly decode the information received. For example, with the +90° cycle slip shown in FIG. 8D, the recovered symbols originally associated with the bit pair (11) are now associated with the bit pair (10). Similarly, the symbols for bit pairs (01), (00), and (10) are now associated with bit pairs (11), (01), and (00), respectively. The incorrect mapping of symbols to bit pairs that results from the cycle slip may cause the incorrect decoding. Although cycle slips of −90° and ±180° are not shown, those cycle slips may also cause received information to be incorrectly decoded.

In FIG. 9A a series 900 of frames is shown as an example to illustrate the use of unique words to detect the occurrence of a cycle slip. Each of the consecutive frames 905, 905-a, 905-b, and 905-c in the series 900 includes a unique word that indicates the alignment (e.g., phase) of the unique word. For example, frame 905 includes unique word 910, while frames 905-a, 905-b, and 905-c include unique words 910-a, 910-b, and 910-c, respectively. In some embodiments, the unique words have a length of about 64 symbols and are inserted every 9,000 symbols, approximately. Although the unique words in the frames of FIG. 9A are shown at the start of each frame, the unique words may be inserted at other locations within each frame.

For purposes of illustration, unique words 910, 910-a, 910-b, and 910-c are represented by a number that indicates their phase alignment. For example, a number "0" may represent 0° phase alignment, a number "1" may represent a +90° phase alignment, a number "2" may represent a +180° phase alignment, and a number "3" may represent a +270° phase alignment. The phase alignment of each unique word may be determined from one or more of the symbols composing the unique word. The number of symbols or length of the unique words may be chosen to ensure that the symbols are detected and the phase alignment is clearly identified. In the example of FIG. 9A, each of the unique words 910, 910-a, 910-b, and 910-c is represented by the number "0" to indicate that all the frames have the same phase alignment and no cycle slips are detected.

In FIG. 9B a series 900-a of frames is shown as an example to illustrate the use of unique words to detect the occurrence of a cycle slip. The consecutive frames 905-d, 905-e, 905-f, and 905-g in the series 900-a include unique words 910-d, 910-e, 910-f, and 910-g, respectively. In the example of FIG. 9B, unique words 910-d and 910-e are represented by the number "0" to indicate that frames 905-d and 905-e are aligned to each other, while unique words 910-f and 910-g are represented by the number "1" to indicate that frames 905-f and 905-g are aligned to each other but are +90° misaligned with respect to frames 905-d and 905-e. The misalignment detected between frame 905-e and frame 905-f may be interpreted as having a cycle slip occur somewhere within frame 905-e. Once a cycle slip is detected within a frame by using the unique words inserted into the frames, the effects of the cycle slip (e.g., data loss) may be mitigated.

Figure 10:
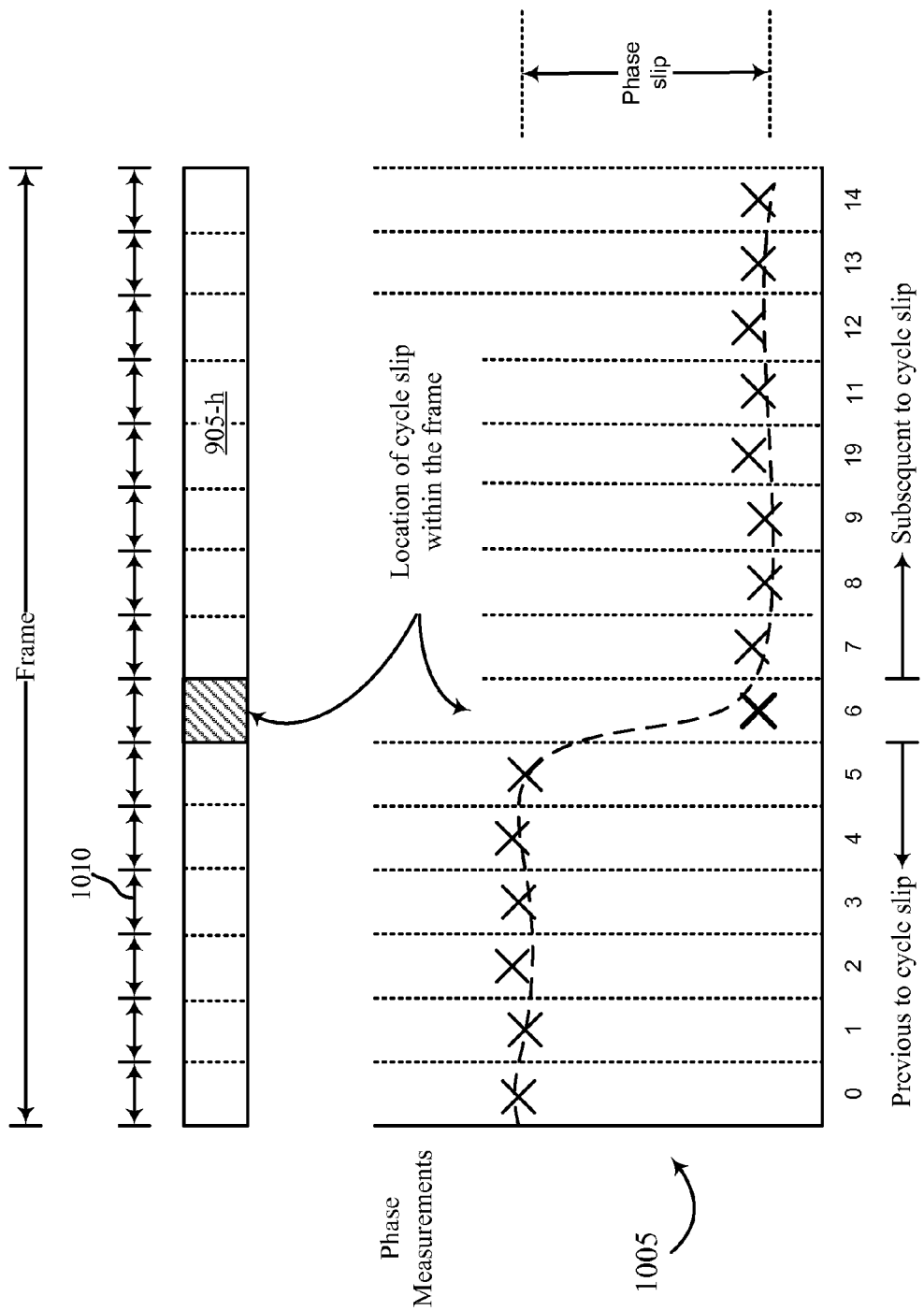
FIG. 10 is a diagram that illustrates an example of identifying a location of the occurrence of a cycle slip within a frame according to various embodiments of the principles described herein.

FIG. 10 illustrates an example of identifying a location of a cycle slip within a frame. A frame 905-h is shown that may be an example of the frame 905-e of FIG. 9B in which a cycle slip has taken place as indicated by the phase misalignment between unique words 910-e and 910-f. In the illustrated embodiment, the frame 905-h includes 15 locations or sections (0-14) defined by a series of time-domain estimation or observation windows 1010 that are used to make phase measurements within the frame 905-h. The estimation or observation window 1010 may also be referred to as a measurement window. \ The optimal size of the observation windows may depend on the relative amount of thermal and phase noise in the system. Larger observation windows may be desirable to remove significant amounts of thermal noise, but smaller observation windows may be desirable to better track changes in phase noise. The total number of observation windows is then dependent on the total frame size.

FIG. 10 also shows a chart 1005 that graphically illustrates the various phase measurements made in each of the locations of the frame 905-h. The large difference in phase measurements (e.g., phase slip) that takes place between locations 5 and 6 may indicate that location 6 is the likely location of the cycle slip within the frame 905-h. For frame 905-h, locations 0-5 are the locations or sections are previous to the cycle slip while locations 7-14 are the locations or sections that are subsequent to the cycle slip. Once location 6 is identified or estimated to be the location of the cycle slip, correction operations may be applied to the portion of the frame 905-h that includes locations 7-14 (i.e., subsequent to the cycle slip) to mitigate the effects of the cycle slip and preserve the data in those locations. In some embodiments, after unique words are used to detect the occurrence of a cycle slip, slip probability metrics may be generated for each of the phase estimation periods during the frame 905-h (e.g., observation window 1010). The location in the frame 905-h where the cycle is determined to have occurred, which in this example is location 6, is the location with the largest slip probability metric.

Figure 11A:
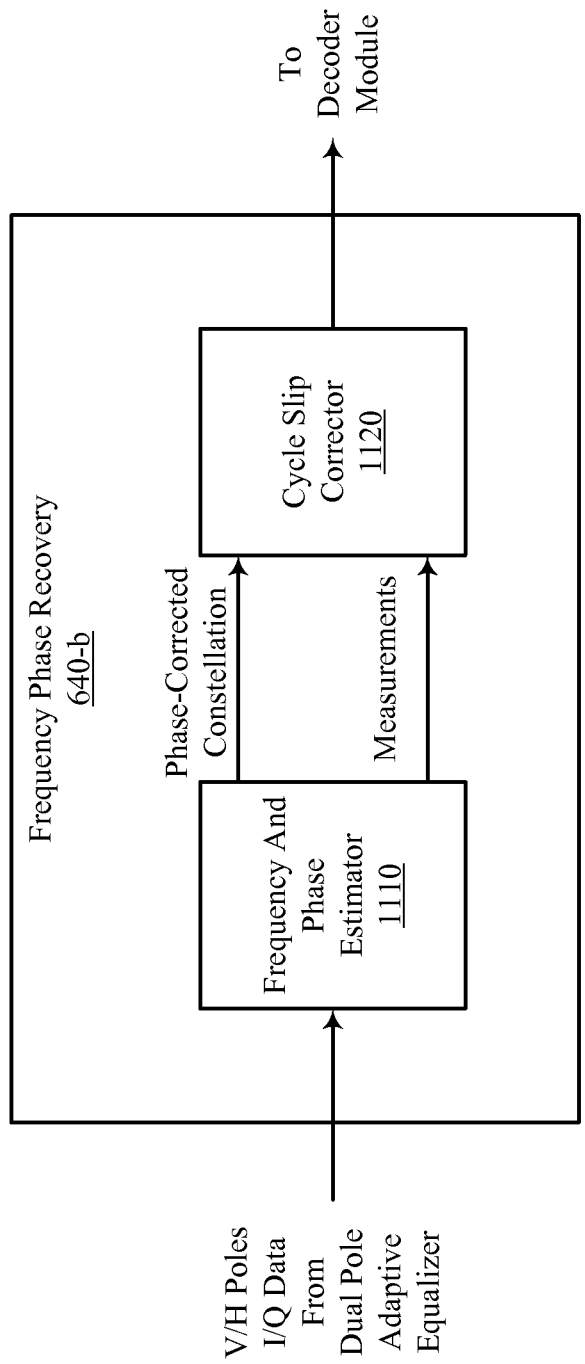
FIG. 11A is block diagram of an example of a frequency phase recovery module according to various embodiments of the principles described herein.

FIG. 11A illustrates a frequency phase recovery 640-b. The frequency phase recovery 640-b may be an example of the frequency phase recovery 640 and the frequency phase recovery 640-a described above with reference to FIG. 6 and FIG. 7, respectively. In the illustrated embodiment, the frequency phase recovery 640-b includes a frequency and phase estimator 1110 and a cycle slip corrector 1120. Each of these components may be in communication, directly or indirectly.

The frequency and phase estimator 1110 may receive vertical (V) and horizontal (H) polarization in-phase (I) and quadrature (Q) data and may use the data to detect and correct for frequency errors and phase errors. For example, the frequency and phase estimator 1110 may perform different measurements, including phase estimation measurements and reliability measurements, in connection with detecting and correcting phase errors. These measurements may be performed at different locations within a frame of data. The measurements for each frame of data may vary based on the size of the measurement or observation window (e.g., observation window 810-d) used to make the measurements. For example, a frame of data that includes phase estimates of symbols from both polarizations may have a larger number of observation windows that are smaller in size. On the other hand, a frame of data that includes symbols from a single polarization may have fewer observation windows that are larger in size. The size of the observation window may be dynamically adjusted based on the phase noise level and/or the rate at which the phase changes. For example, while a smaller observation window may be desirable to have more granularity in the phase noise measurements but a larger observation window may be involved to collect sufficient data because of the high thermal noise level. Once the measurements are made and the phase errors corrected, the frequency and phase estimator 1110 may provide the measurements and the phase-corrected constellation information to the cycle slip corrector 1120.

To perform the reliability measurements, the frequency and phase estimator 1110 may compute cycle slip probability (e.g., cycle slip probability metrics) based on multiple factors or combination of those factors. For example, one may use constellation radius, or average power in an estimation or observation window, or a difference between consecutive phase estimates, or a difference between several phase estimates adjacent to the potential cycle slip locations.

The frequency and phase estimator 1110 may combine phase estimates of symbols of one polarization and phase estimates of symbols of a different polarization into a frame to make the phase estimation and reliability measurements. To combine the phase estimates, the frequency and phase estimator 1110 may adjust a phase of the symbols of the one polarization to be substantially the same as a phase of the symbols of the different polarization. The adjustment may include removing a quasi-static difference in the nominal relative phase of the two polarizations.

The cycle slip corrector 1120 may detect a cycle slip occurrence within a frame in a series of consecutive frames based on unique words inserted into the frames as illustrated in FIG. 9A and FIG. 9B. The cycle slip detector 1120 may detect the cycle slip occurrence by detecting a phase (e.g., phase alignment) corresponding to the unique word in the frame, detecting a phase (e.g., phase alignment) corresponding to a unique word in a next frame, and determining whether the two detected phases are different. The cycle slip corrector 1120 may identify a location in the frame where the cycle slip occurred based on measurements made within the frame and may adjust a phase of a portion of the frame that is subsequent to the location of the cycle slip to correct that portion for the cycle slip. The adjustment may include rotating the phase of the portion of the frame that is subsequent to the location of the cycle slip. In some embodiments, the phase may be rotated so that the phase in that portion of the frame aligns with the phase of the next frame. The measurements used may include the phase estimation measurements and reliability measurements provided by the frequency and phase estimator 1110.

Figure 11B:
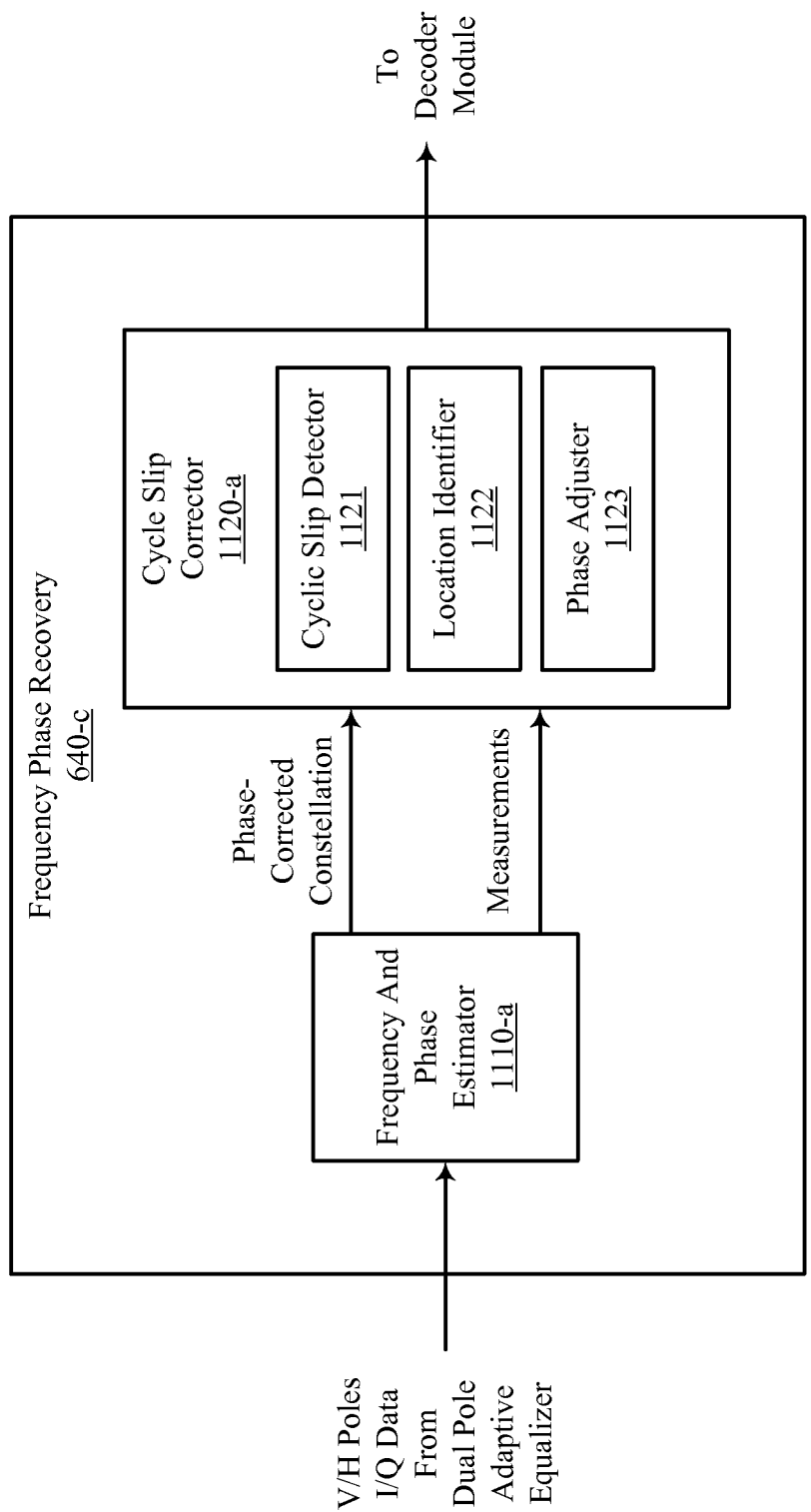
FIG. 11B is block diagram of another example of a frequency phase recovery module according to various embodiments of the principles described herein.

FIG. 11B illustrates a frequency phase recovery 640-c. The frequency phase recovery 640-c may be an example of the frequency phase recovery 640, 640-a, and 640-b described above with reference to FIG. 6, FIG. 7, and FIG. 11A, respectively. In the illustrated embodiment, the frequency phase recovery 640-c includes a frequency and phase estimator 1110-a and a cycle slip corrector 1120-a, which may be examples of the frequency and phase estimator 1110 and the cycle slip corrector 1120 of FIG. 11A, respectively. The cycle slip corrector 1120-a includes a cycle slip detector 1121, a location identifier 1122, and a phase adjuster 1123. Each of these components may be in communication, directly or indirectly.

The cycle slip detector 1121 is configured to detect a cycle slip occurrence within a frame based on a unique word in the frame. The cycle slip detector 1121 is configured to detect a phase (e.g., phase alignment) corresponding to the unique word in the frame, detect a phase (e.g., phase alignment) corresponding to a unique word in a next frame, and detect the cycle slip occurrence within the frame when the two detected phases are different.

The location identifier 1122 is configured to identify a location in the frame where the cycle slip occurred based on measurements made within the frame. Those measurements may include the measurements provided to the cycle slip corrector 1120-a by the frequency and phase estimator 1110-a. The phase adjuster 1123 is configured adjust a phase of a portion of the frame subsequent to the location of the cycle slip to correct that portion of the frame for the cycle slip. The adjustment may include rotating the phase of the portion of the frame that is subsequent to the location of the cycle slip. In some embodiments, the phase may be rotated so that the phase in that portion of the frame aligns with the phase of the next frame.

Figure 12A:
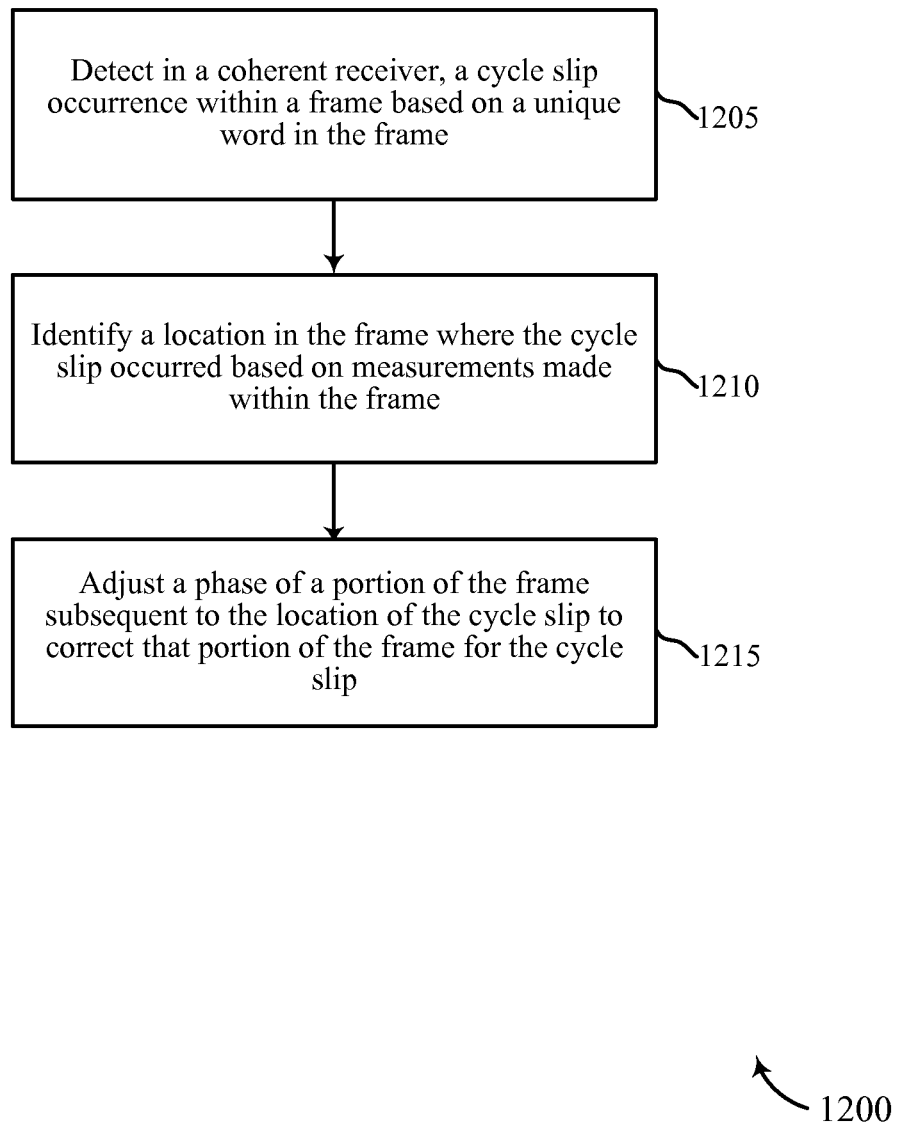
FIG. 12A is a flow chart of an example of a method for detecting and correcting a cycle slip occurrence according to various embodiments of the principles described herein.

FIG. 12A illustrates a flowchart diagram of an example method 1200 for detecting and correcting a cycle slip occurrence. The method 1200 may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the frequency phase recovery 640, 640-a, 640-b, and 640-c of FIG. 6, FIG. 7, FIG. 11A, and FIG. 11B, respectively; and/or the modem of FIG. 7.

At block 1205, in a coherent receiver, a cycle slip occurrence is detected within a frame based on a unique word in the frame. Examples of the use of unique words for detecting a cycle slip are described above with respect to FIG. 9A and FIG. 9B. At block 1210, a location of the cycle slip in the frame is identified based on measurements made within the frame. An example of identifying the location of a cycle slip in a frame is described above with respect to FIG. 10. At block 1215, a phase of a portion of the frame that is subsequent to the location of the cycle slip is adjusted to correct that portion of the frame for the cycle slip. In some embodiments, the adjustment includes rotating the phase of the portion of the frame that is subsequent to the location of the cycle slip. The adjustment may align the phase of the rotated portion of the frame with the phase of the next frame.

In some embodiments of the method 1200, detecting the occurrence of the cycle slip includes detecting a phase corresponding to the unique word in the frame, detecting a phase corresponding to a unique word in a next frame, and detecting the cycle slip occurrence within the frame when the two detected phases are different.

In some embodiments of the method 1200, the measurements are made at different locations within the frame, where the measurements at each location include a phase estimation measurement and a reliability measurement. The measurements at each location may be based on symbols within a measurement window about the location. In some embodiments, a size of the measurement window is dynamically adjusted based on one or more of a phase noise level, a rate of changes in phase, and a thermal noise level. In some embodiments, making reliability measurements includes determining a radius (e.g., power) for each of different locations within the frame based on symbols at the location, determining differences in phase estimation measurements for consecutive locations, and determining a reliability measurement for each of the different locations based on the radius and the difference in the phase estimation measurements for the location.

Figure 12B:
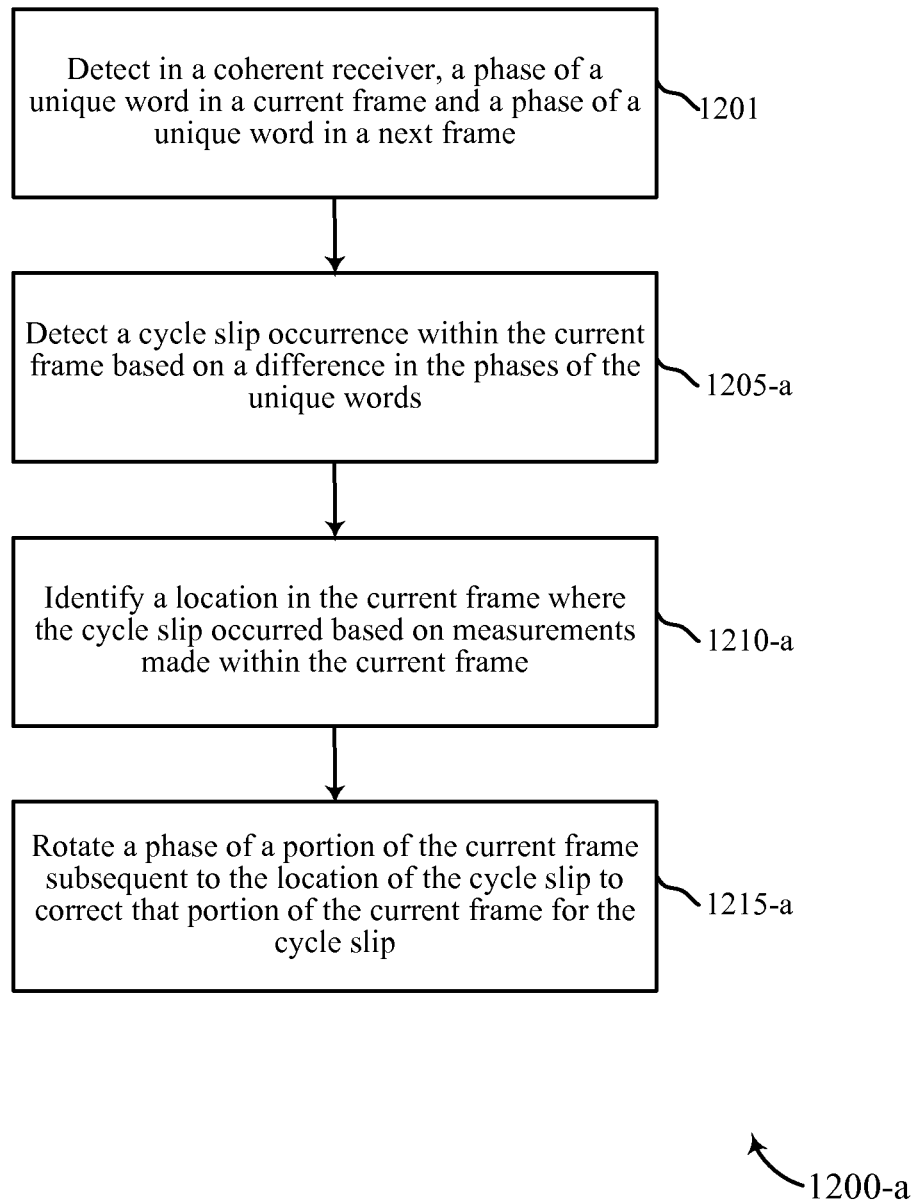
FIG. 12B is a flow chart of another example of a method for detecting and correcting a cycle slip occurrence according to various embodiments of the principles described herein.

FIG. 12B illustrates a flowchart diagram of an example method 1200-a for detecting and correcting a cycle slip occurrence. The method 1200-a, like the method 1200 above, may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the frequency phase recovery 640, 640-a, 640-b, and 640-c of FIG. 6, FIG. 7, FIG. 11A, and FIG. 11B, respectively; and/or the modem of FIG. 7.

At block 1201, in a coherent receiver, a phase (e.g., phase alignment) of a current frame is detected and a phase (e.g., phase alignment) of a next frame is also detected. At block 1205-a, a cycle slip occurrence is detected within the current frame based on a difference in the phases of the unique words. Examples of the use of unique words for detecting a cycle slip in a current frame are described above with respect to FIG. 9A and FIG. 9B. At block 1210-a, a location of the cycle slip in the current frame is identified based on measurements made within the current frame. An example of identifying the location of a cycle slip in a current frame is described above with respect to FIG. 10. At block 1215-a, a phase of a portion of the current frame that is subsequent to the location of the cycle slip is adjusted to correct that portion of the current frame for the cycle slip. In some embodiments, the adjustment includes rotating the phase of the portion of the current frame that is subsequent to the location of the cycle slip. The adjustment may align the phase of the rotated portion of the current frame with the phase of the next frame.

Figure 12C:
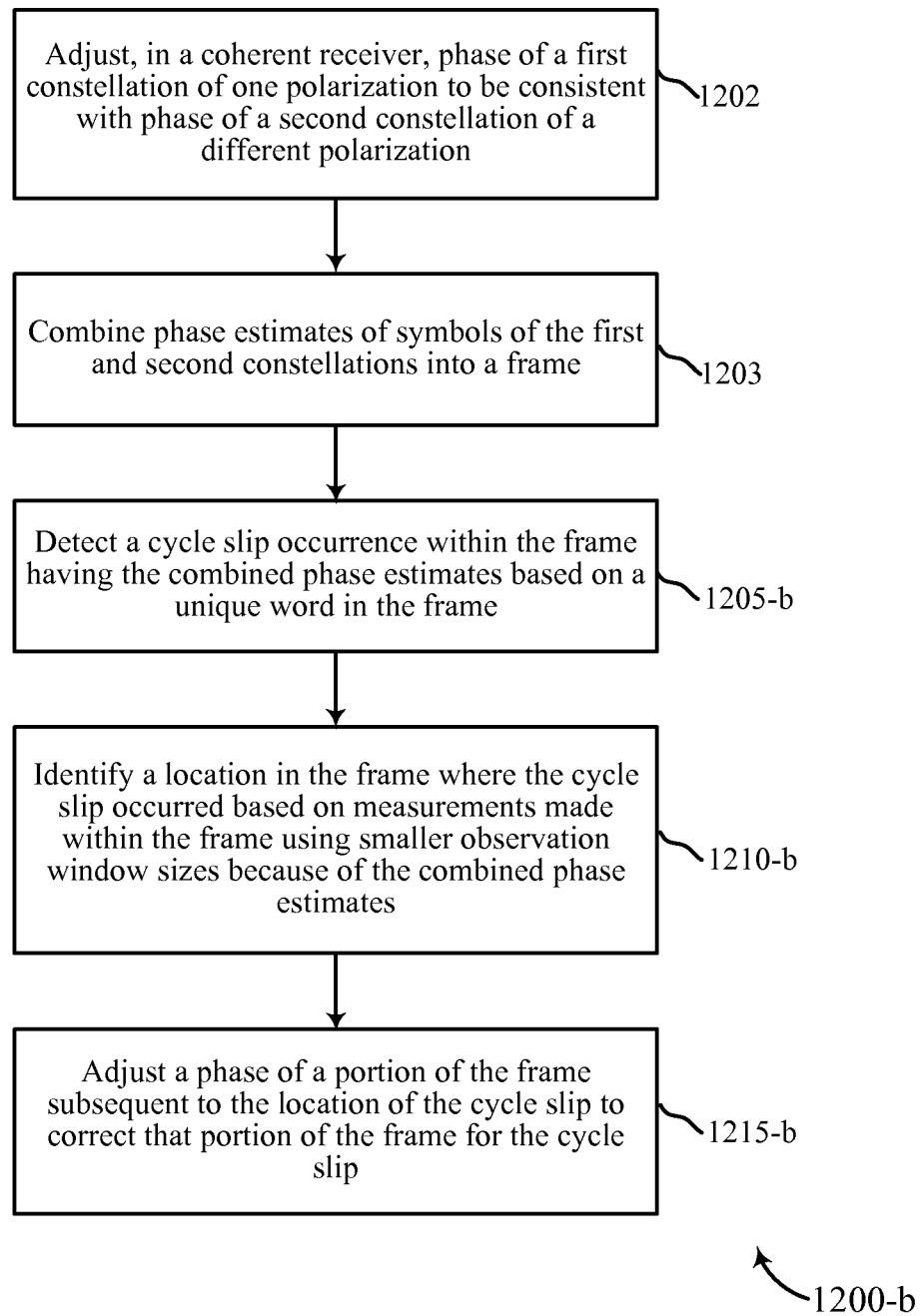
FIG. 12C is a flow chart of yet another example of a method for detecting and correcting a cycle slip occurrence according to various embodiments of the principles described herein.

FIG. 12C illustrates a flowchart diagram of an example method 1200-b for detecting and correcting a cycle slip occurrence. The method 1200-b, like the methods 1200 and 1200-a above, may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the frequency phase recovery 640, 640-a, 640-b, and 640-c of FIG. 6, FIG. 7, FIG. 11A, and FIG. 11B, respectively; and/or the modem of FIG. 7.

At block 1202, in a coherent receiver, adjust a phase of a first constellation of one polarization to be consistent with a phase of a second constellation of a different polarization. That is, the adjustment may include adjusting a phase of symbols of one polarization to be substantially the same as a phase of symbols of the different polarization. The adjustment may include removing a quasi-static difference in the nominal relative phase of the two polarizations. At block 1203, phase estimates of the symbols of the first constellation and phase estimates of the symbols of the second constellation are combined into a frame. The combination may be performed by, for example, the frequency and phase estimators 1110 and 1110-a of FIG. 11A and FIG. 11B, respectively.

At block 1205-b, a cycle slip occurrence is detected within the frame that has the combined phase estimates based on a unique word in the frame. Examples of the use of unique words for detecting a cycle slip are described above with respect to FIG. 9A and FIG. 9B. At block 1210-b, a location of the cycle slip in the frame is identified based on measurements made within the frame using a smaller observation window size because of the combined symbols. An example of identifying the location of a cycle slip in a frame is described above with respect to FIG. 10. At block 1215-b, a phase of a portion of the frame that is subsequent to the location of the cycle slip is adjusted to correct that portion of the frame for the cycle slip. In some embodiments, the adjustment includes rotating the phase of the portion of the frame that is subsequent to the location of the cycle slip. The adjustment may align the phase of the rotated portion of the frame with the phase of the next frame.

In some embodiments, a system for correcting data from an optical signal includes means for detecting in a coherent receiver, a cycle slip occurrence within a frame based on a unique word in the frame. The means may include, but need not be limited to, a cycle slip detector as illustrated in FIG. 11B, for example. The system may also include means for identifying a location in the frame where the cycle slip occurred based on measurements made within the frame. The means may include, but need not be limited to, a location identifier as illustrated in FIG. 11B, for example. The system may further include means for adjusting a phase of a portion of the frame subsequent to the location of the cycle slip to correct that portion of the frame for the cycle slip. The means may include, but need not be limited to, a phase adjuster as illustrated in FIG. 11B, for example.

The means for detecting the cycle slip occurrence within the frame may include means for detecting a phase corresponding to the unique word in the frame, means for detecting a phase corresponding to a unique word in a next frame, and means for detecting the cycle slip occurrence within the frame when the two detected phases are different. These means may include, but need not be limited to, a cycle slip detector as illustrated in FIG. 11B, for example. The means for adjusting the phase of the portion of the frame subsequent to the location of the cycle slip may include means for rotating the phase of the portion of the frame that is subsequent to the location of the cycle slip. The means may include, but need not be limited to, a phase adjuster as illustrated in FIG. 11B, for example.

The system may also include means for making the measurements at different locations within the frame, the measurements at each location comprising a phase estimation measurement and a reliability measurement. The means may include, but need not be limited to, a frequency and phase estimator as illustrated in FIG. 11A and/or FIG. 11B, for example. The system may also include means for determining a radius for each of different locations within the frame based on symbols at the location, means for determining differences in phase estimation measurements for consecutive locations, and means for determining a reliability measurement for each of the different locations based on the radius and the difference in the phase estimation measurements for the location, the reliability measurements being part of the measurements made within the frame to identify the location of the cycle slip. These means may include, but need not be limited to, a frequency and phase estimator as illustrated in FIG. 11A and/or FIG. 11B, for example.

In some embodiments, another system for correcting data from an optical signal includes means for combining, in a coherent receiver, phase estimates of symbols of one polarization and phase estimates of symbols of a different polarization into a frame. The means may include, but need not be limited to, a frequency and phase estimator as illustrated in FIG. 11A and/or FIG. 11B, for example. The system may also include means for detecting a cycle slip occurrence within the frame based on a unique word in the frame. The means may include, but need not be limited to, a cycle slip detector as illustrated in FIG. 11B, for example. The system may further include means for identifying a location in the frame where the cycle slip occurred based on measurements made on the combined phase estimates within the frame. The means may include, but need not be limited to, a location identifier as illustrated in FIG. 11B, for example. The system may further include means for adjusting a phase of a portion of the frame subsequent to the location of the cycle slip to correct that portion of the frame for the cycle slip. The means may include, but need not be limited to, a phase adjuster as illustrated in FIG. 11B, for example.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method for correcting data from an optical signal, comprising:
   detecting in a coherent receiver, a cycle slip occurrence within a frame based on a unique word in the frame;
   identifying a location in the frame where the cycle slip occurred based on measurements made within the frame; and
   adjusting a phase of a portion of the frame subsequent to the location of the cycle slip to correct that portion of the frame for the cycle slip by rotating the phase of the portion of the frame that is subsequent to the location of the cycle slip.

2. The method of claim 1, further comprising:
   detecting a phase corresponding to the unique word in the frame;
   detecting a phase corresponding to a unique word in a next frame; and
   detecting the cycle slip occurrence within the frame when the two detected phases are different.

3. The method of claim 1, further comprising:
   making the measurements at different locations within the frame, the measurements at each location comprising a phase estimation measurement and a reliability measurement.

4. The method of claim 1, further comprising:
   making the measurements at different locations within the frame, the measurements at each location comprising a phase estimation measurement and a reliability measurement, and the measurements at each location being based on symbols within a measurement window about the location.

5. The method of claim 4, further comprising:
   dynamically adjusting a size of the measurement window, the adjustment being based on one or more of a phase noise level, a rate of changes in phase, and a thermal noise level.

6. The method of claim 1, further comprising:
   determining a radius for each of different locations within the frame based on symbols at the location;
   determining differences in phase estimation measurements for consecutive locations; and
   determining a reliability measurement for each of the different locations based on the radius and the difference in the phase estimation measurements for the location, the reliability measurements being part of the measurements made within the frame to identify the location of the cycle slip.

7. A system for correcting data from an optical signal, comprising:
   means for detecting in a coherent receiver, a cycle slip occurrence within a frame based on a unique word in the frame;
   means for identifying a location in the frame where the cycle slip occurred based on measurements made within the frame; and
   means for adjusting a phase of a portion of the frame subsequent to the location of the cycle slip to correct that portion of the frame for the cycle slip by rotating the phase of the portion of the frame that is subsequent to the location of the cycle slip.

8. The system of claim 7, wherein the means for detecting the cycle slip occurrence within the frame comprise:
   means for detecting a phase corresponding to the unique word in the frame;
   means for detecting a phase corresponding to a unique word in a next frame; and
   means for detecting the cycle slip occurrence within the frame when the two detected phases are different.

9. The system of claim 7, further comprising:
   means for making the measurements at different locations within the frame, the measurements at each location comprising a phase estimation measurement and a reliability measurement.

10. The system of claim 7, further comprising:
    means for determining a radius for each of different locations within the frame based on symbols at the location;
    means for determining differences in phase estimation measurements for consecutive locations; and
    means for determining a reliability measurement for each of the different locations based on the radius and the difference in the phase estimation measurements for the location, the reliability measurements being part of the measurements made within the frame to identify the location of the cycle slip.

11. A coherent receiver device, comprising:
a detector module configured to detect a cycle slip occurrence within a frame based on a unique word in the frame;
an identifier module configured to identify a location in the frame where the cycle slip occurred based on measurements made within the frame; and
an adjuster module configured to adjust a phase of a portion of the frame subsequent to the location of the cycle slip to correct that portion of the frame for the cycle slip by rotating the portion of the frame subsequent to the location of the cycle slip to adjust the phase of that portion of the frame.

12. The coherent receiver device of claim 11, wherein the detector module is configured to:
detect a phase corresponding to the unique word in the frame;
detect a phase corresponding to a unique word in a next frame; and
detect the cycle slip occurrence within the frame when the two detected phases are different.

13. The coherent receiver device of claim 11, further comprising:
an estimator module configured to make the measurements at different locations within the frame, the measurements at each location comprising a phase estimation measurement and a reliability measurement.

14. The coherent receiver device of claim 11, further comprising:
an estimator module configured to make the measurements at different locations within the frame, the measurements at each location comprising a phase estimation measurement and a reliability measurement, and the measurements at each location being based on symbols within a measurement window about the location.

15. The coherent receiver device of claim 14, wherein the estimator module is configured to dynamically adjust a size of the measurement window, the adjustment being based on one or both of a phase noise level and a rate of change in phase.

16. The coherent receiver device of claim 11, further comprising:
an estimator module configured to:
determine a radius for each of different locations within the frame based on symbols at the location;
determine differences in phase estimation measurements for consecutive locations; and
determine a reliability measurement for each of the different locations based on the radius and the difference in the phase estimation measurements for the location, the reliability measurements being part of the measurements made within the frame to identify the location of the cycle slip.

17. A method for correcting data from an optical signal, comprising:
combining, in a coherent receiver, phase estimates of symbols of one polarization and phase estimates of symbols of a different polarization into a frame;
detecting a cycle slip occurrence within the frame based on a unique word in the frame;
identifying a location in the frame where the cycle slip occurred based on measurements made on the combined phase estimates within the frame; and
adjusting a phase of a portion of the frame subsequent to the location of the cycle slip to correct that portion of the frame for the cycle slip by rotating the phase of the portion of the frame that is subsequent to the location of the cycle slip.

18. The method of claim 17, further comprising:
making the measurements at different locations within the frame, the measurements at each location comprising a phase estimation measurement and a reliability measurement, and the measurements at each location being based on a corresponding portion of the combined phase estimates.

19. The method of claim 17, further comprising:
adjusting a phase of the symbols of the one polarization to be substantially the same as a phase of the symbols of the different polarization; and
making the measurements at different locations within the frame, the measurements at each location comprising a phase estimation measurement and a reliability measurement, and the measurements at each location being based on a corresponding portion of the combined symbols.

20. The method of claim 17, further comprising:
determining a radius for each of different locations within the frame based on the combined symbols at the location;
determining differences in phase estimation measurements for consecutive locations; and
determining a reliability measurement for each of the different locations based on the radius and the difference in the phase estimation measurements for the location, the reliability measurements being part of the measurements made on the combined symbols within the frame to identify the location of the cycle slip.

21. A system for correcting data from an optical signal, comprising:
means for combining, in a coherent receiver, phase estimates of symbols of one polarization and phase estimates of symbols of a different polarization into a frame;
means for detecting a cycle slip occurrence within the frame based on a unique word in the frame;
means for identifying a location in the frame where the cycle slip occurred based on measurements made on the combined phase estimates within the frame; and
means for adjusting a phase of a portion of the frame subsequent to the location of the cycle slip to correct that portion of the frame for the cycle slip by rotating the phase of the portion of the frame that is subsequent to the location of the cycle slip.

22. A coherent receiver device, comprising:
a detector module configured to:
combine phase estimates of symbols of one polarization and phase estimates of symbols of a different polarization into a frame, and
detect a cycle slip occurrence within the frame based on a unique word in the frame;
an identifier module configured to identify a location in the frame where the cycle slip occurred based on measurements made on the combined phase estimates within the frame; and
an adjuster module configured to adjust a phase of a portion of the frame subsequent to the location of the cycle slip to correct that portion of the frame for the cycle slip by rotating the phase of the portion of the frame that is subsequent to the location of the cycle slip.

\* \* \* \* \*